(12) United States Patent
Jorgensen et al.

(10) Patent No.: US 12,462,693 B2
(45) Date of Patent: Nov. 4, 2025

(54) SYSTEM AND METHOD FOR FLIGHT ARRIVAL TIME PREDICTION

(71) Applicant: SITA Information Networking Computing UK Limited, Middlesex (GB)

(72) Inventors: Morten Tobias Jorgensen, Killaloe (IE); Ayse Gul Ozkan, Hampshire (GB)

(73) Assignee: SITA Information Networking Computing UK Limited, Middlesex (GB)

( * ) Notice: Subject to any disclaimer, the term of this patent is extended or adjusted under 35 U.S.C. 154(b) by 449 days.

(21) Appl. No.: 17/613,980

(22) PCT Filed: May 27, 2020

(86) PCT No.: PCT/GB2020/051279
§ 371 (c)(1),
(2) Date: Nov. 24, 2021

(87) PCT Pub. No.: WO2020/240177
PCT Pub. Date: Dec. 3, 2020

(65) Prior Publication Data
US 2022/0215760 A1    Jul. 7, 2022

(30) Foreign Application Priority Data
May 28, 2019   (GB) ...................................... 1907502

(51) Int. Cl.
*G08G 5/30*   (2025.01)
*G08G 5/52*   (2025.01)
(Continued)

(52) U.S. Cl.
CPC ................. *G08G 5/30* (2025.01); *G08G 5/52* (2025.01); *G08G 5/55* (2025.01); *G08G 5/76* (2025.01)

(58) Field of Classification Search
CPC ..... G08G 5/003; G08G 5/0065; G08G 5/0091
See application file for complete search history.

(56) References Cited

U.S. PATENT DOCUMENTS

| 8,140,199 B2 | 3/2012 | Barry et al. |
| 9,076,327 B1 * | 7/2015 | Baiada ................. G08G 5/0091 |

(Continued)

FOREIGN PATENT DOCUMENTS

| WO | 200062234 A1 | 10/2000 |
| WO | 2000062234 A1 | 10/2000 |

OTHER PUBLICATIONS

Ksipsita, Emirates Dubai to Washington DC 13 hours long Flight Path, Jan. 8, 2017, YouTube, https://www.youtube.com/watch?v=qw0VSotsSTY (Year: 2017).*

(Continued)

*Primary Examiner* — Tyler J Lee
(74) *Attorney, Agent, or Firm* — Bradley Arant Boult Cummings LLP; Daniel E. Sineway, Esq.; Adam J. Thompson, Esq.

(57) ABSTRACT

A system and computer implemented method for predicting a flight arrival time of a given aircraft flight, between an origin airport and a destination airport, of a given aircraft based on a set of features is disclosed. The method comprises determining a predicted time delay of a flight departure time of the given aircraft flight from the origin airport by processing a first plurality of features of the set of features using a first predictive model; determining a predicted time duration of the given aircraft flight from the origin airport to an entry point of a standard terminal arrival route for the destination airport; and determining a predicted time duration of the given aircraft flight from the entry point of the standard terminal arrival route for the destination airport to landing on a runway of the destination airport.

19 Claims, 7 Drawing Sheets

(51) Int. Cl.
  *G08G 5/55* (2025.01)
  *G08G 5/76* (2025.01)

(56) References Cited

U.S. PATENT DOCUMENTS

| | | | |
|---|---|---|---|
| 10,665,114 B2* | 5/2020 | Irrgang | G08G 5/34 |
| 10,773,900 B1* | 9/2020 | Pinel | B65G 43/10 |
| 10,783,288 B1* | 9/2020 | Timar | G08G 5/56 |
| 11,024,183 B2* | 6/2021 | Mikami | G08G 5/32 |
| 11,379,920 B2* | 7/2022 | Steinmann | G06Q 20/10 |
| 2002/0138184 A1 | 9/2002 | Flynn et al. | |
| 2002/0138194 A1* | 9/2002 | Flynn | G08G 5/0043 |
| | | | 701/120 |
| 2005/0125265 A1 | 6/2005 | Bramnick et al. | |
| 2007/0124059 A1 | 5/2007 | Barry et al. | |
| 2009/0276250 A1 | 11/2009 | King et al. | |
| 2010/0063716 A1* | 3/2010 | Brozat | G08G 5/0043 |
| | | | 701/120 |
| 2012/0218127 A1 | 8/2012 | Kroen | |
| 2012/0245835 A1* | 9/2012 | Weitz | G08G 5/0013 |
| | | | 701/120 |
| 2013/0138584 A1* | 5/2013 | Vana | B64C 25/405 |
| | | | 705/500 |
| 2014/0088799 A1* | 3/2014 | Tino | G06F 30/20 |
| | | | 703/2 |
| 2016/0130013 A1* | 5/2016 | Rangan | G06Q 10/04 |
| | | | 340/963 |
| 2016/0180718 A1* | 6/2016 | Shapiro | G08G 5/0091 |
| | | | 701/418 |
| 2016/0240090 A1 | 8/2016 | Marcella et al. | |
| 2017/0320589 A1* | 11/2017 | Moravek | G08G 5/065 |
| 2018/0181144 A1* | 6/2018 | Steinmann | G05D 1/0022 |
| 2018/0276571 A1* | 9/2018 | Poddar | G06Q 10/02 |
| 2018/0276573 A1* | 9/2018 | Otillar | G06Q 10/02 |
| 2020/0193842 A1* | 6/2020 | Mikami | G08G 5/50 |

OTHER PUBLICATIONS

Examination Report issued in United Kingdom Application No. GB1907502.7, dated Nov. 1, 2022.

Murphy, et al., "Physics-Based and Parametric Trajectory Prediction Performance Comparison for Traffic Flow Management," AIAA Guidance, Navigation, and Control Conference and Exhibit: AIAA 2003-5629; Aug. 11-14, Aug. 2003; 12 pages.

Levy, et al., "A Real-Time ETA-to-Threshold Prediction Tool," 2006 IEEE, 1-4244-0378-2/06; 12 pages.

Kern, et al., "Data-Driven Aircraft Estimated Time of Arrival Prediction," 2015 IEEE, 978-1-4799-5927-3; 8 pages.

Ahmed, et al., "A Multi-Layer Artificial Neural Network Approach for Runway Configuration Prediction," UNSW Canberra (date unknown); 26 pages.

Ahmed, et al., "A MultiLayer Artifical Neural Network Approach for Runway Configuration Prediction," BNSDOCID: XP-55745240A (date unknown): 8 pages.

Tien, et al., "Using Ensemble Weather Forecasts for Predicting Airport Runway Configuration and Capacity," AIAA Aviation: Jun. 13-17, 2016: 12 pages.

International Preliminary Report on Patentability for International Application No. PCT/GB2020/051279, mailed Dec. 9, 2021, 18 Pages.

International Search Report and Written Opinion issued in International Application No. PCT/GB2020/051279 mailed Nov. 18, 2020; 23 pages.

Office Action for Indian Application No. 202127057580, mailed Aug. 4, 2023, 9 Pages.

* cited by examiner

```
┌─────────────────────────────────────────────────────────────────┐
│ Receiving a scheduled departure time of the given aircraft flight, a │
│ plurality of samples of airport weather data indicating the weather │
│ conditions at the origin airport at respective points in time, a scheduled │
│ arrival time of a previous flight of the given aircraft, an actual or ├─── 40
│ estimated arrival delay of the given aircraft at the origin airport from the │
│ previous flight of the given aircraft, and an actual departure time of the │
│ given aircraft flight from the origin airport. │
└─────────────────────────────────────────────────────────────────┘
                                    │
                                    ▼
┌─────────────────────────────────────────────────────────────────┐
│ Determining weighed values of the airport weather data samples   ├─── 42
│ based on an intensity of the weather conditions.                 │
└─────────────────────────────────────────────────────────────────┘
                                    │
                                    ▼
┌─────────────────────────────────────────────────────────────────┐
│ Determining a percentage time delay by dividing the actual or    │
│ estimated arrival delay of the given aircraft at the origin airport from │
│ the previous flight of the given aircraft by a time difference between ├─── 44
│ the scheduled arrival time of a previous flight of the given aircraft and │
│ the scheduled departure time of the given aircraft flight.       │
└─────────────────────────────────────────────────────────────────┘
                                    │
                                    ▼
┌─────────────────────────────────────────────────────────────────┐
│ Determining an actual time delay of the flight departure time by │
│ subtracting the scheduled departure time of the given aircraft flight ├─── 46
│ from the actual departure time of the given aircraft flight.     │
└─────────────────────────────────────────────────────────────────┘
                                    │
                                    ▼
┌─────────────────────────────────────────────────────────────────┐
│ Applying the artificial neural network to the plurality of features, │
│ wherein the plurality of features comprise the scheduled departure │
│ time of the given aircraft flight, the plurality of samples of airport ├─── 48
│ weather data, the percentage time delay and the actual departure time │
│ of the given aircraft flight from the origin airport.            │
└─────────────────────────────────────────────────────────────────┘
```

FIG. 3

Receiving a rated cruise speed of the given aircraft and an expected cruising altitude for the given aircraft flight, a flight plan route comprising a plurality of waypoints indicating a flight path for the given aircraft flight, a plurality of tail-wind speed predictions corresponding to a plurality of segments of the flight path between the origin airport and the entry point of the standard terminal arrival route for the destination airport at the expected cruising altitude, and an actual time duration of the given aircraft flight from the origin airport to an entry point of a standard terminal arrival route for the destination airport. — 50

Determining an estimated average air speed of the given aircraft flight by multiplying the rated cruise speed of the given aircraft by the speed of sound at the expected cruising altitude for the given aircraft flight. — 52

Determining an estimated standard terminal arrival route for the destination airport as the standard terminal arrival route with an entry waypoint that is closest in distance to the final waypoint of the flight plan route. — 54

Determining an effective ground speed for each of the plurality of segments along the flight path by summing the estimated average air speed of the given aircraft flight and the respective tail-wind speed prediction for that segment of the flight path. — 56

FIG. 4A

Receiving a predicted wind vector at a location of the destination airport for each of a plurality of time windows, and a plurality of known past runway configurations, each identifying the availability and landing direction of each runway of the plurality of possible runways of the destination airport during a plurality of time windows in the past. ~80

Determining a tail wind speed component parallel to the longitudinal axis of the runway for each runway of the plurality of possible runways of the destination airport based on the predicted wind vector for each of the plurality of time windows. ~82

Applying the artificial neural network to the plurality of known past runway configurations and the determined tail wind speed component parallel to the longitudinal axis of the runway for each runway of the plurality of possible runways to estimate a runway configuration of the destination airport during a next time window in the future. ~84

Iteratively applying the artificial neural network to the plurality of known past runway configurations, the determined tail wind speed component parallel to the longitudinal axis of the runway for each runway of the plurality of possible runways and the estimated runway configurations of the destination airport to estimate a runway configuration of the destination airport during a subsequent time window in the future. ~86

FIG. 6

SYSTEM AND METHOD FOR FLIGHT ARRIVAL TIME PREDICTION

CROSS REFERENCE TO RELATED APPLICATIONS

This application is a national phase application of, and claims benefit of and priority to International Application No. PCT/GB2020/051279, filed May 27, 2020, entitled "SYSTEM AND METHOD FOR FLIGHT ARRIVAL TIME PREDICTION," which claims priority to Great Britain Application No. 1907502.7, filed May 28, 2019, entitled "SYSTEM AND METHOD FOR FLIGHT ARRIVAL TIME PREDICTION," the disclosures of which are incorporated herein by reference as if set forth herein in their entireties.

FIELD OF THE INVENTION

The present application relates to a system and method for flight arrival time prediction. In particular, the application relates to a system and method for flight arrival time prediction based on a set of features corresponding to received and determined data items.

BACKGROUND TO THE INVENTION

The scale of the aviation industry is predicted to increase year on year with more people and goods being flown that ever before. Much of this air traffic is centred around the various regional hubs spread over the globe, which typically operate on the edge of their capacity with airlines and other industry partners often being concerned about the need for more runways and departure gates as well as general capacity improvements. Any delay in the scheduled arrival and departure time of an aircraft will have a knock on effect of delay propagation, not only for the next route that aircraft and/or crew are needed to operate, but also for other runway and gate users who were scheduled to be using those facilities during the delayed (or indeed early) arrival and/or departure times.

For airlines, delays may require replacement crews or aircraft for subsequent flights (e.g. due to crewing time limits) and require diversions and delays of other aircraft. The capacity of the airport is reduced due to the dips and corresponding surges associated with delays and some assets such as aircraft may be at the airport for longer than usual or be required to land out of hours. Delays result in passenger dissatisfaction and delay of cargo will be particularly detrimental for perishables, such as food produce.

The average cost of a delayed flight to an airline has been estimated to be $3,971, with delays costing the aviation industry approximately $25 Billion globally. There is a clear need for improvements in the aviation industry in order to minimise delays and reduce the impact that these delays can have as set out above.

While there are numerous causes of disruption, many of these are within the control of airlines and/or airports and so the effect of these causes can be minimised by enabling these parties to take proactive action.

US2005/0125265 relates to a method for rebooking passengers who are unable to travel on a scheduled flight by obtaining passenger data and comparing this with one or more rules to determine rebooking flight candidates to be presented to the user. This is an example of reactive methods for handling the subsequent impact of a disrupted flight.

U.S. Pat. No. 8,140,199 describes a system for estimating an arrival time at an airport gate based on the current location of an aircraft, the scheduled gate number and an average time from the actual runway arrival to the specific gate derived from historical data. The actual landed runway may also be predicted by using location heading and speed information regarding the aircraft or using the flight plan that was filed prior to the flight.

US2012/0218127 describes a Terminal Intelligent Monitoring System that uses both historical and current data on flights, weather, aircraft and ground conditions to generate alerts on potential threats to safety/legality of flying. Some examples of data input feeds include a database for historical data, real time pre-flight and in-flight data, flight plan data, airport information and data from third party sources. The output of this system may be the generation of a report with a recommendation to delay or cancel a flight at the initial flight check stage prior to take off.

US2009/0276250 relates to a system for providing advanced flight status information comprising potential delays or cancellations. Received user data, inbound and outbound aircraft data and manually entered constraint data is processed using a decision tree to determine which inbound aircraft is likely to be used for the user's outbound flight and whether that inbound aircraft is delayed in order to generate travel update data for the user. Air Traffic Control (ATC) data, weather data and/or Aircraft Communications Addressing and Reporting System (ACARS) data such as OUT, OFF, ON and IN (OOOI) timestamped event data may also be analysed for determining delays.

The lumo application platform analyses data and makes real time flight delay predictions using machine learning along with a likelihood factor for the delay length. The lumo application platform examines historical flight data, weather forecasts at airports, US Federal Aviation Administration (FAA) airspace data, taxi and flight times between airports, and airport schedules to determine delays and the impact on inbound flights.

The inventors have appreciated that there is a need for improved visibility of these delays so that the industry can move from a reactive approach to a proactive approach for disruption management and action can be taken as early as possible.

SUMMARY OF THE INVENTION

The invention is defined in the independent claims to which reference should now be directed. Advantageous features are set out in the dependent claims.

In a first aspect, the present disclosure relates to a computer implemented method for predicting a flight arrival time of a given aircraft flight, between an origin airport and a destination airport, of a given aircraft based on a set of features. The method comprises determining a predicted time delay of a flight departure time of the given aircraft flight from the origin airport by processing a first plurality of features of the set of features using a first predictive model, determining a predicted time duration of the given aircraft flight from the origin airport to an entry point of a standard terminal arrival route for the destination airport by processing a second plurality of features of the set of features using a second predictive model and determining a predicted time duration of the given aircraft flight from the entry point of the standard terminal arrival route for the destination airport to landing on a runway of the destination airport by processing a third plurality of features of the set of features using a third predictive model.

The method further comprises determining the predicted flight arrival time of the given aircraft flight at the destination airport by adding the predicted time delay of a flight departure time of the given aircraft flight from the origin airport, the predicted time duration of the given aircraft flight from the origin airport to an entry point of a standard terminal arrival route for the destination airport and the predicted time duration of the given aircraft flight from the entry point of the standard terminal arrival route for the destination airport to landing on a runway of the destination airport to a received scheduled departure time of the given aircraft flight from the origin airport.

By breaking the overall prediction of the flight arrival time for the aircraft into these three separate sections, each with a predictive model tuned to the features and requirements of the corresponding stage of the flight, the inventors have appreciated that the accuracy of the overall prediction may be improved.

Optionally, the first plurality of features may comprise a plurality of samples of airport weather data indicating the weather conditions at the origin airport at respective points in time and an actual or estimated arrival delay of the given aircraft at the origin airport from a previous flight of the given aircraft as a percentage of a time duration between a scheduled arrival time of the previous flight of the given aircraft and the scheduled departure time of the given aircraft flight. Optionally, the values for features relating to airport weather data may be weighted based on an intensity of the weather conditions. The inventors have appreciated that weather conditions and the available turnaround time for an aircraft between consecutive flights are key considerations in the prediction of flight departure delays and accordingly an accurate prediction can be made based on these features.

Optionally, the airport weather data comprises a wind speed, a wind gust speed, an amount of change in the wind direction, a side wind speed component perpendicular to the longitudinal axis of a runway at the origin airport and a side wind gust speed component perpendicular to the longitudinal axis of a runway at the origin airport; wherein the amount of change in the wind direction is determined by comparing consecutive samples of received wind data.

Optionally, the first plurality of features further comprise a plurality of route weather data, indicating the weather conditions at a plurality of locations along the planned route of the given aircraft flight, weighted based on a distance between the location along the planned route and the origin airport. The inventors have appreciated that the departure of some flights may be delayed in order to try and avoid bad weather conditions that have been identified along the planned route of the aircraft flight and accordingly the accuracy of the prediction may be further improved by including these features.

Optionally, the first plurality of features further comprise one or more of a visibility distance at the origin airport, weather data for the destination airport at an estimated arrival time of the given aircraft flight at the destination airport, aviation authority notifications, an identification of an airline operating the given aircraft flight, an indication of the aircraft type of the given aircraft, an indication of wake vortex size associated with the given aircraft, the time and day of the week that the given aircraft flight is scheduled to depart on, an indication of whether the scheduled departure time of the given aircraft flight is during daylight hours, a scheduled duration of the given aircraft flight, an airport of departure for the previous flight of the given aircraft, a plurality of time windowed averages for a number of flights departing from the origin airport, and/or an indication of whether the given aircraft flight is a domestic, international or intercontinental flight. These additional features may further improve the accuracy of the first predictive model.

Optionally, the first predictive model may be an ensemble learning model; in particular the first predictive model may be a regression model comprised of an artificial neural network. The artificial neural network of the first predictive model may optionally have two hidden layers of 1000 nodes each, two hidden layers of 500 nodes each and a final output layer with a single node, 200 epochs with one iteration per epoch, an RMSPROP updater having an initial momentum of 0.9 with a learning rate of 0.01 using a mean squared error loss function, the hidden layers may use Leaky Rectified Linear Units, a batch size of 256 samples and L2 0.025 regularization.

Optionally, the method may further comprise receiving a rated cruise speed of the given aircraft and an expected cruising altitude for the given aircraft flight; determining an estimated average air speed of the given aircraft flight by multiplying the rated cruise speed of the given aircraft by the speed of sound at the expected cruising altitude for the given aircraft flight; receiving a flight plan route comprising a plurality of waypoints indicating a flight path for the given aircraft flight; determining an estimated standard terminal arrival route for the destination airport as the standard terminal arrival route with an entry waypoint that is closest in distance to the final waypoint of the flight plan route; receiving a plurality of tail-wind speed predictions corresponding to a plurality of segments of the flight path between the origin airport and the entry point of the standard terminal arrival route for the destination airport at the expected cruising altitude; determining an effective ground speed for each of the plurality of segments along the flight path by summing the estimated average air speed of the given aircraft flight and the respective tail-wind speed prediction for that segment of the flight path; determining an estimated flight time for each of the plurality of segments along the flight path by multiplying the effective ground speed for each segment by a length of the respective segment; and determining an estimated flight time between the origin airport and the entry point of the standard terminal arrival route for the destination airport by summing the respective estimated flight times for each of the plurality of segments; wherein the second plurality of features comprise the estimated standard terminal arrival route for the destination airport, the estimated flight time between the origin airport and the entry point of the estimated standard terminal arrival route for the destination airport, an actual or predicted take-off time for the given aircraft flight, and a distance from the origin airport to the destination airport.

In this manner, the method takes into account the impact of wind speed and direction on the amount of flying time between the origin airport and the entry point of a standard terminal arrival route for the destination airport and thus provides an improved prediction of this amount of flying time.

Optionally, the second plurality of features may further comprise an identification of the destination airport, an identification of an airline operating the given aircraft flight, an indication of the aircraft type of the given aircraft, an indication of wake vortex size associated with the given aircraft, the time and day of the week that the given aircraft flight is scheduled to depart on, an indication of whether the scheduled departure time of the given aircraft flight is during daylight hours, and/or a number of arriving aircraft estimated to be entering the estimated standard terminal arrival route for the destination airport during each of a plurality of time windows.

Optionally, the second plurality of features may further comprise indications of a wake vortex spacing distance associated with a first pair and a second pair of aircraft, wherein the first pair of aircraft is the given aircraft and an adjacent aircraft estimated to reach the standard terminal arrival route entry point before the given aircraft and the second pair of aircraft is the given aircraft and an adjacent aircraft estimated to reach the standard terminal arrival route entry point after the given aircraft. In this manner, the second predictive model advantageously takes into account the impact of the size of respective aircraft and the corresponding scale of the wake vortices left behind them/in front of them by other aircraft on the minimum spacing requirements for the separation distance between consecutive aircraft.

Optionally, the second plurality of features may further comprise one or more of a visibility distance at the origin airport, weather data for the destination airport at an estimated arrival time of the given aircraft flight at the destination airport, a plurality of samples of weather data indicating the weather conditions at respective points in time along the path of the flight plan, aviation authority notifications, a scheduled duration of the given aircraft flight, an airport of departure for the previous flight of the given aircraft, and/or an indication of whether the given aircraft flight is a domestic, international or intercontinental flight.

Optionally, the method may further comprise receiving location information for the origin airport, the destination airport and a most recent location of the given aircraft; and determining an indication of a percentage distance travelled by the given aircraft between the origin airport and the destination airport based on the location of the origin airport, the location of the destination airport and the most recent location of the given aircraft; wherein the second plurality of features further comprise the indication of the percentage distance travelled by the given aircraft between the origin airport and the destination airport.

Optionally, the second predictive model may be a regression model comprised of a random forest prediction model, in particular the random forest prediction model may have 25 decision trees, a number of features per tree is set equal to the square root of the total number of features in the second plurality of features, a maximum depth of each tree of 30, a maximum number of bins of 256 and variance impurity being used.

Optionally, the method may further comprise receiving an indication of the wake vortex size and estimated landing order for each of a plurality of aircraft estimated to be flying between the entry point of the standard terminal arrival route for the destination airport and a runway of the destination airport, wherein the estimated landing order represents the order that each aircraft of the plurality of aircraft is estimated to land on the runway of the destination airport; determining a minimum spacing between each pair of adjacent aircraft based on the estimated landing order and the indication of the wake vortex size for each of the plurality of aircraft; and determining an aggregate wake vortex spacing distance for the standard terminal approach route by summing the determined minimum spacing between each pair of adjacent aircraft; wherein the third plurality of features comprise the determined aggregate wake vortex spacing distance for the standard terminal arrival route.

The inventors have appreciated that an accurate prediction of the time duration of the given aircraft flight from the entry point of the standard terminal arrival route for the destination airport to landing on a runway of the destination airport can be based on the aggregate wake vortex spacing of the aircraft on the standard terminal arrival route and thus this aspect of the prediction may be improved in this manner.

Optionally, the method may further comprise determining an estimated standard terminal approach route for the given aircraft from a plurality of standard terminal approach routes of the given airport based on one or more of: identifying the standard terminal approach route that has an initial waypoint that is closest to a waypoint of a received flight plan corresponding to the given aircraft flight; identifying the standard terminal approach route that has an initial waypoint that is closest to a projected flight path from a known location and bearing of the given aircraft to the destination airport; or a known most commonly used standard terminal approach route for the given aircraft; wherein the third plurality of features further comprise the determined standard terminal approach route. This advantageously enables the time that an aircraft is predicted to be on a standard terminal arrival route for a given airport to be refined and accuracy improved by identifying the most likely standard terminal arrival route that the aircraft is, or will be, following.

Optionally, the method may further comprise receiving a flight plan for the given aircraft flight; wherein the third plurality of features further comprises an excess flight time for the given aircraft determined to be equal to a current time minus a time associated with a take-OFF timestamp for the given aircraft flight minus a duration of a flying time identified in the flight plan. This advantageously enables the method to take into account the prioritisation of the landing of flights that have been in the air longer than planned, and which may be starting to run low on fuel.

Optionally, the third plurality of features may further comprise one or more of a received indication of an airline operating a given aircraft flight; a received identification of the origin airport; a received scheduled arrival day of the week and time of day for the given aircraft flight; a received indication of whether the scheduled arrival time for the given aircraft flight is during daylight hours; a plurality of received average of the aircraft arrival volumes for the given airport at respective times of day and/or week; received weather data for the destination airport; and/or a received indication of whether the given aircraft has been diverted to the destination airport from a different airport.

Optionally, the third plurality of features may further comprise an indication of the runway capacity at a time of arrival of the given aircraft at the destination airport, wherein the indication of runway capacity is based on one or more received notices of flight restrictions and hazards corresponding to the time of arrival of the given aircraft. Optionally, the third plurality of features may further comprise a runway configuration indicating an availability and a landing direction of each runway of a plurality of possible runways at the destination airport at the estimated time of arrival of the given aircraft.

Optionally, the third predictive model may be an ensemble learning model, in particular a regression model comprised of an artificial neural network. Such an artificial neural network may optionally comprise three hidden layers of 1000 nodes each and a final output layer with a single node, 250 epochs with one iteration per epoch, an ADAM updater having an initial momentum of 0.9 with a learning rate of 0.01 using a mean squared error loss function, the hidden layers use Leaky Rectified Linear Units, the output layer has an identity function activation function, the batch size is 512 samples, with L2 0.05 regularization being used and the dropout of weights cleared after each epoch being 25%.

Optionally, the method may further comprise determining an estimated runway configuration of the destination airport at a given moment in time based on a fourth predictive model. A fourth plurality of features of the set of features may be processed using the fourth predictive model to estimate a runway configuration of the destination airport during a next time window in the future; wherein the fourth plurality of features comprise a plurality of known past runway configurations, each identifying the availability and landing direction of each runway of the plurality of possible runways of the destination airport during a plurality of time windows in the past, and a tail wind speed component parallel to the longitudinal axis of the runway for each runway of the plurality of possible runways of the destination airport. The estimated runway configuration of the destination airport during the next time window may then be added to the fourth plurality of features and the prediction iteratively repeated to estimate a runway configuration of the destination airport during each subsequent time window in the future.

In this manner, the method may advantageously improve the prediction of the time duration of the given aircraft flight from the entry point of the standard terminal arrival route for the destination airport to landing on a runway of the destination airport by more accurately identifying the most likely runway that a given flight land on, which will have an impact on the final flight path (and corresponding time taken) during this flight phase.

Optionally, the fourth plurality of features may further comprise one or more of a side wind speed component perpendicular to the longitudinal axis of a runway at the origin airport; a side wind gust speed component perpendicular to the longitudinal axis of each runway of the plurality of possible runways of the destination airport; a length of time since the runway configuration last changed; an amount of change in the wind direction, determined by comparing consecutive samples of received wind data; aviation authority notifications; an indication of whether a scheduled arrival time of the given aircraft flight at the destination airport is during daylight hours; the time and day of the week that the given aircraft flight is scheduled to arrive at the destination airport on; a visibility distance at the destination airport; desired noise abatement restrictions and/or a number of flights expected to be landing at the destination airport during a time window including the scheduled arrival time of the given aircraft, an adjacent time window prior to the scheduled arrival time and an adjacent time window after the scheduled arrival time.

Optionally, the fourth predictive model is a regression model comprised of an artificial neural network. Such an artificial neural network of the fourth predictive model may have two hidden layers of 1000 nodes each, two hidden layers of 500 nodes each and a final output layer with a single node per runway pair at the destination airport, 1000 epochs with one iteration per epoch, an RMSPROP updater having an initial momentum of 0.9 with a learning rate of 0.01 and using a mean squared error loss function, wherein the hidden layers use Leaky Rectified Linear Units, the batch size is 64 samples and L2 0.01 regularization is used.

In a second aspect, the present disclosure relates to a system for predicting a flight arrival time of a given aircraft flight, between an origin airport and a destination airport, of a given aircraft based on a set of features. The system comprises an input interface configured to receive the set of features and a scheduled departure time of the given aircraft flight from the origin airport; a first predictive unit configured to determine a predicted time delay of a flight departure time of the given aircraft flight from the origin airport by processing a first plurality of features of the set of features using a first predictive model; a second predictive unit configured to determine a predicted time duration of the given aircraft flight from the origin airport to an entry point of a standard terminal arrival route for the destination airport by processing a second plurality of features of the set of features using a second predictive model; a third predictive unit configured to determine a predicted time duration of the given aircraft flight from the entry point of the standard terminal arrival route for the destination airport to landing on a runway of the destination airport by processing a third plurality of features of the set of features using a third predictive model; a processor configured to determine the predicted flight arrival time of the given aircraft flight at the destination airport by adding the predicted time delay of a flight departure time of the given aircraft flight from the origin airport, the predicted time duration of the given aircraft flight from the origin airport to an entry point of a standard terminal arrival route for the destination airport and the predicted time duration of the given aircraft flight from the entry point of the standard terminal arrival route for the destination airport to landing on a runway of the destination airport to the received scheduled departure time of the given aircraft flight from the origin airport; and an output interface configured to output the predicted flight arrival time of the given aircraft flight at the destination airport.

By breaking the overall prediction of the flight arrival time for the aircraft into these three separate sections, each with a predictive model tuned to the features and requirements of the corresponding stage of the flight, the inventors have appreciated that the system may improve the accuracy of the overall prediction.

In a third aspect, the present disclosure relates to a non-transitory computer readable medium comprising instructions that, when executed by a computer, cause the computer to carry out the steps of any of the above methods.

In a fourth aspect, the present disclosure relates to a computer implemented method for training an artificial neural network predictive model to predict a time delay of a flight departure time of the given aircraft flight from the origin airport based on a plurality of features. This method comprises, for each aircraft flight of a plurality of aircraft flights: receiving a scheduled departure time of the given aircraft flight; receiving a plurality of samples of airport weather data indicating the weather conditions at the origin airport at respective points in time; determining weighed values of the airport weather data samples based on an intensity of the weather conditions; receiving a scheduled arrival time of a previous flight of the given aircraft; receiving an actual or estimated arrival delay of the given aircraft at the origin airport from the previous flight of the given aircraft; determining a percentage time delay by dividing the actual or estimated arrival delay of the given aircraft at the origin airport from the previous flight of the given aircraft by a time difference between the scheduled arrival time of a previous flight of the given aircraft and the scheduled departure time of the given aircraft flight; receiving an actual departure time of the given aircraft flight from the origin airport; determining an actual time delay of the flight departure time by subtracting the scheduled departure time of the given aircraft flight from the actual departure time of the given aircraft flight; and applying the artificial neural network to the plurality of features, wherein the plurality of features comprise scheduled departure time of the given aircraft flight, the plurality of samples of airport weather data, the percentage time delay and the actual departure time of the given aircraft flight from the origin airport.

In a fifth aspect, the present disclosure relates to a computer implemented method for training a random forest predictive model to predict a time duration of the given aircraft flight from the origin airport to an entry point of a standard terminal arrival route for the destination airport based on a plurality of features. This method comprises, for a plurality of samples of the plurality of features of each aircraft flight of a plurality of aircraft flights: receiving a rated cruise speed of the given aircraft and an expected cruising altitude for the given aircraft flight; determining an estimated average air speed of the given aircraft flight by multiplying the rated cruise speed of the given aircraft by the speed of sound at the expected cruising altitude for the given aircraft flight; receiving a flight plan route comprising a plurality of waypoints indicating a flight path for the given aircraft flight; determining an estimated standard terminal arrival route for the destination airport as the standard terminal arrival route with an entry waypoint that is closest in distance to the final waypoint of the flight plan route; receiving a plurality of tail-wind speed predictions corresponding to a plurality of segments of the flight path between the origin airport and the entry point of the standard terminal arrival route for the destination airport at the expected cruising altitude; determining an effective ground speed for each of the plurality of segments along the flight path by summing the estimated average air speed of the given aircraft flight and the respective tail-wind speed prediction for that segment of the flight path; determining an estimated flight time for each of the plurality of segments along the flight path by multiplying the effective ground speed for each segment by a length of the respective segment; determining an estimated flight time between the origin airport and the entry point of the standard terminal arrival route for the destination airport by summing the respective estimated flight times for each of the plurality of segments; receiving an actual time duration of the given aircraft flight from the origin airport to an entry point of a standard terminal arrival route for the destination airport; and applying the random forest predictive model to the plurality of samples of the plurality of features for each aircraft flight; wherein the plurality of features comprise the estimated standard terminal arrival route for the destination airport, the estimated flight time between the origin airport and the entry point of the estimated standard terminal arrival route for the destination airport, an actual or predicted take-off time for the given aircraft flight, a distance from the origin airport to the destination airport, and the actual time duration of the given aircraft flight from the origin airport to an entry point of a standard terminal arrival route for the destination airport.

In a sixth aspect, the present disclosure relates to a computer implemented method for training an artificial neural network predictive model to predict a time duration of the given aircraft flight from the entry point of the standard terminal arrival route for the destination airport to landing on a runway of the destination airport based on a plurality of features. The method comprises, for each aircraft flight of a plurality of aircraft flights: receiving an indication of the wake vortex size and estimated landing order for each of a plurality of aircraft estimated to be flying between the entry point of the standard terminal arrival route for the destination airport and a runway of the destination airport, wherein the estimated landing order represents the order that each aircraft of the plurality of aircraft is estimated to land on the runway of the destination airport; determining a minimum spacing between each pair of adjacent aircraft based on the estimated landing order and the indication of the wake vortex size for each of the plurality of aircraft; determining an aggregate wake vortex spacing distance for the standard terminal approach route by summing the determined minimum spacing between each pair of adjacent aircraft; receiving an actual time duration of the given aircraft flight from the entry point of the standard terminal arrival route for the destination airport to landing on a runway of the destination airport; and applying the artificial neural network to the plurality of features for each aircraft flight, wherein the plurality of features comprise the determined aggregate wake vortex spacing distance for the standard terminal arrival route and the actual time duration of the given aircraft flight from the entry point of the standard terminal arrival route for the destination airport to landing on a runway of the destination airport.

In a seventh aspect, the present disclosure relates to a computer implemented method for training an artificial neural network predictive model to predict an estimated runway configuration of the destination airport at a given moment in time. This method comprises receiving a predicted wind vector at a location of the destination airport for each of a plurality of time windows; determining a tail wind speed component parallel to the longitudinal axis of the runway for each runway of the plurality of possible runways of the destination airport based on the predicted wind vector for each of the plurality of time windows; receiving a plurality of known past runway configurations, each identifying the availability and landing direction of each runway of the plurality of possible runways of the destination airport during a plurality of time windows in the past; applying the artificial neural network to the plurality of known past runway configurations and the determined tail wind speed component parallel to the longitudinal axis of the runway for each runway of the plurality of possible runways to estimate a runway configuration of the destination airport during a next time window in the future; and iteratively applying the artificial neural network to the plurality of known past runway configurations, the determined tail wind speed component parallel to the longitudinal axis of the runway for each runway of the plurality of possible runways and the estimated runway configurations of the destination airport to estimate a runway configuration of the destination airport during a subsequent time window in the future.

BRIEF DESCRIPTION OF THE DRAWINGS

Embodiments of the disclosure will now be described, by way of example only, and with reference to the accompanying drawings, in which:

FIG. 3 is a flowchart of a method for training a predictive model to predict a flight departure time delay according to a second aspect of the present disclosure;

FIGS. 4A and 4B are a flowchart of a method for training a predictive model to predict a time duration of a flight from an origin airport to an entry point of a standard terminal arrival route according to a third aspect of the present disclosure;

FIG. 6 is a flowchart of a method for training a predictive model to predict an estimated runway configuration of the destination airport according to a fifth aspect of the present disclosure.

DETAILED DESCRIPTION

The present invention relates to a platform for predicting the arrival times of inbound aircraft at various phases before and during a flight using a range of sophisticated machine learning models covering the various components of a flight that can experience delays in order to provide an estimated arrival time for future arriving aircraft.

By applying deep machine learning artificial intelligence to the available data regarding aircraft, airports, environmental conditions and other relevant events, such as Notice To Airmen (NOTAM) alerts and restrictions, historical and real time data can be leveraged to predict future flight delays and enable proactive disruption management.

The inventors have appreciated that the final arrival time of a flight may be predicted by dividing the flight phases into sub-blocks and estimating the temporal duration of each of those sub-blocks. These sub-blocks may relate to the departure phase (including the taxi-out phase), the flight time to entry of a Standard Terminal Arrival Route (STAR) and the time spent in the STAR of the aircraft flight to be predicted. The prediction may also be extended to further include the taxi-in phase of the aircraft flight to be predicted. Corresponding predictions for each of these sub-blocks may also be calculated for the previous flight of that same physical aircraft in order to further improve the predictions.

Figure 1:
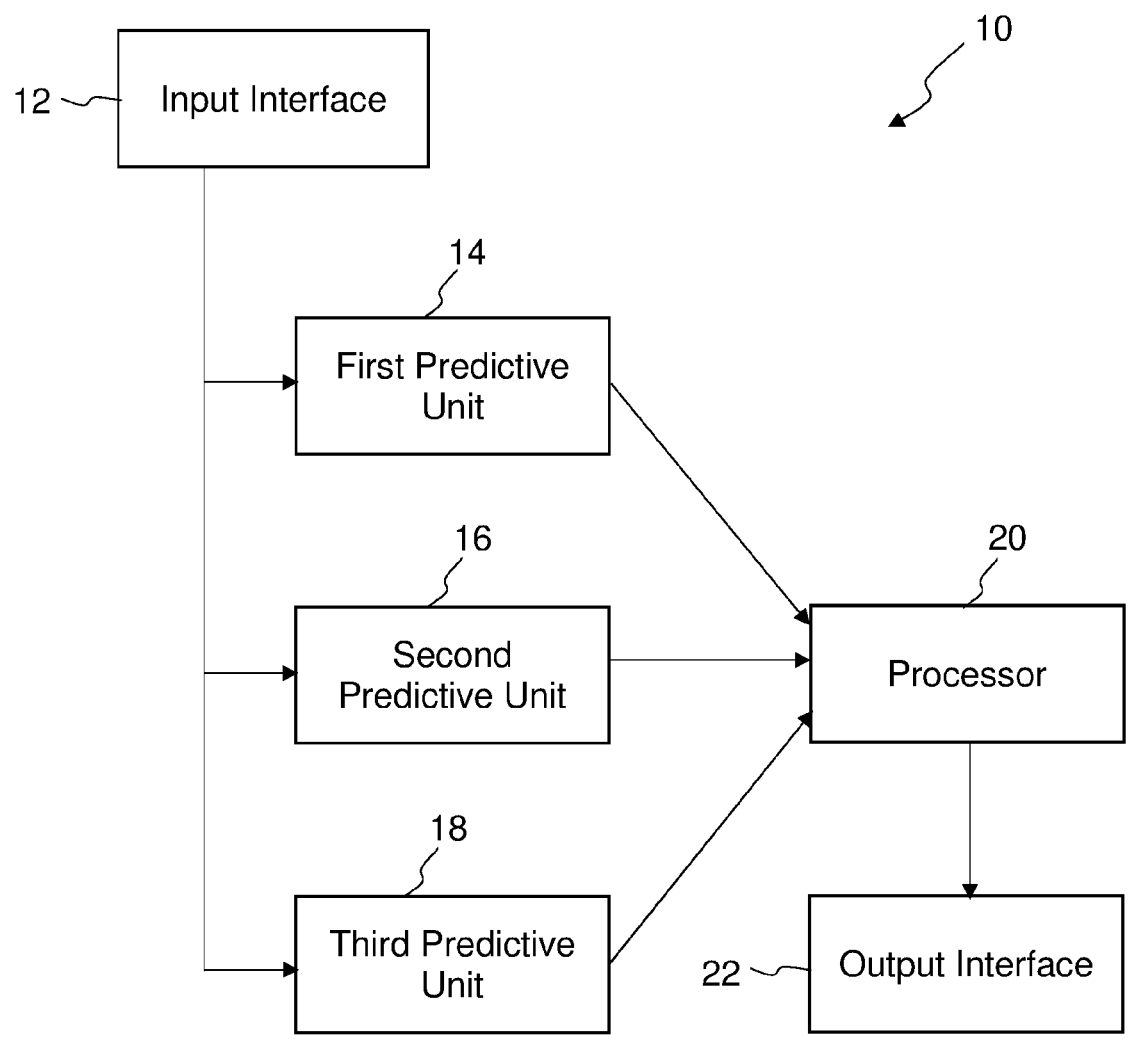
FIG. 1 is a block diagram of a system according to a first aspect of the present disclosure.
Figure 2:
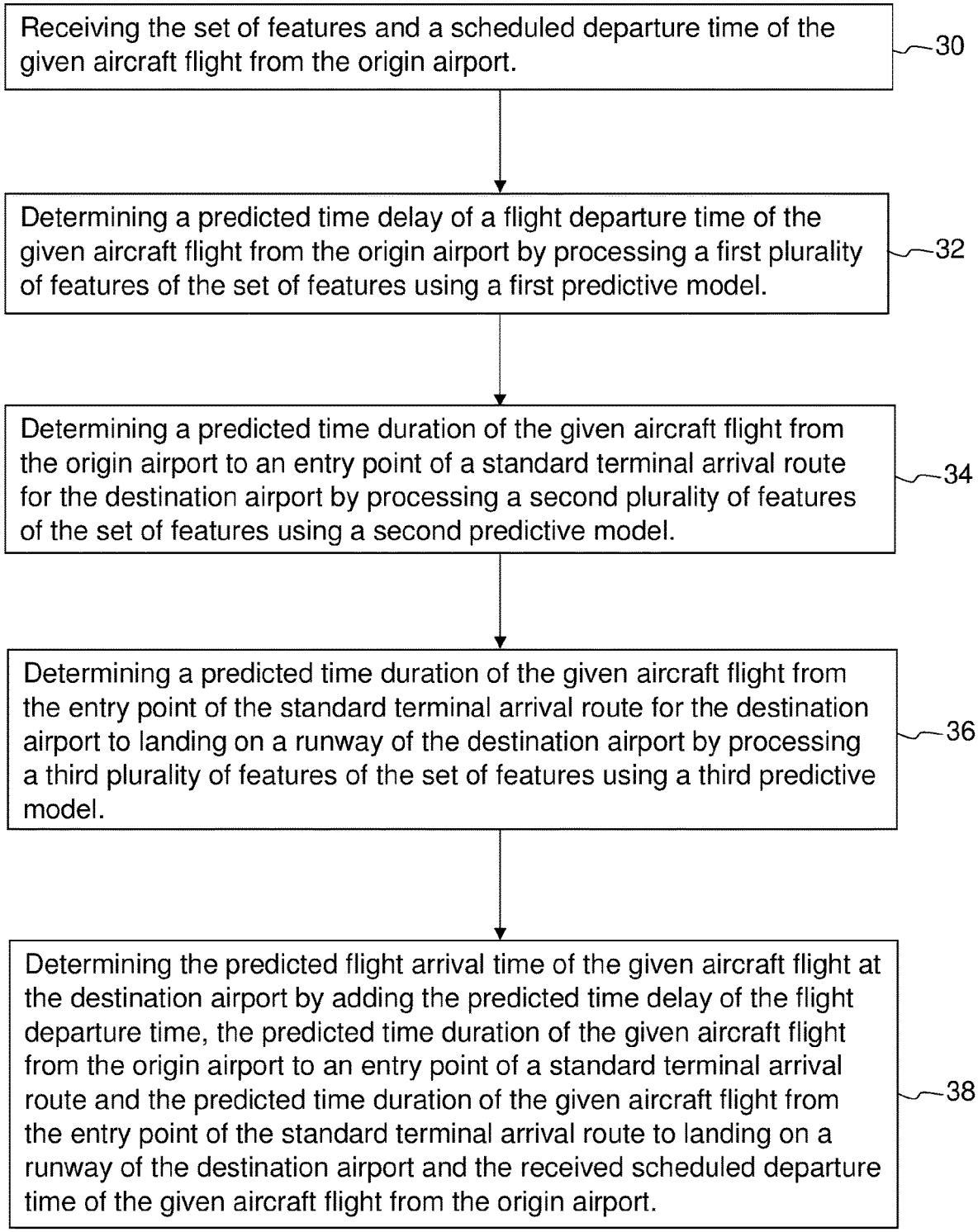
FIG. 2 is a flowchart of a method for predicting a flight arrival time of an aircraft flight according to a first aspect of the present disclosure.

In an embodiment of the present disclosure, a system for predicting a flight arrival time of an aircraft flight according to FIG. 1 may be provided. With reference to FIG. 1, the system 10 may include an input interface 12, a first predictive unit 14, a second predictive unit 16, a third predictive unit 18, a processor 20 and an output interface 22. FIG. 2 illustrates a flowchart of a method for predicting a flight arrival time of an aircraft flight according to a first aspect of the present disclosure and the system of FIG. 1. The input interface 12 of the system 10 may be configured to receive a set of features as well as a scheduled departure time for the aircraft whose flight is to be predicted as set out in step 30 of FIG. 2. This aircraft may be referred to herein as the given aircraft and the flight may be referred to as the given aircraft flight.

The received set of features may include features relating to characteristics of the given aircraft itself, the take-off and landing configurations of the respective origin and destination airports for the given aircraft flight and weather/aviation authority data relating to the origin and destination airports for example. A different subset of the received set of features may be provided to each of the first predictive unit 14, the second predictive unit 16 and the third predictive unit 18 for use in their corresponding predictions—these subsets may be referred to as a first plurality of features, a second plurality of features and a third plurality of features respectively. It will be appreciated that the set of features comprises the first plurality of features, the second plurality of features and the third plurality of features, and that any given feature may be included in more than one of the respective plurality of features provided to the respective predictive models. Further discussion of these features will be provided in the discussion of each of the predictive models below.

Once the set of features has been received at the input interface 12 in step 30, the respective first to third plurality of features may be provided to the respective first to third predictive units for use in the corresponding predictions. As set out in step 32 of FIG. 2, the first predictive unit 14 is used to determine a predicted time delay of a flight departure time of the given aircraft flight from the origin airport by processing the first plurality of features of the set of features. In step 34 the second predictive unit 16 is used to determine a predicted time duration of the given aircraft flight from the origin airport to an entry point of a STAR for the destination airport by processing the second plurality of features of the set of features; and in step 36 the third predictive unit 18 is used to determine a predicted time duration of the given aircraft flight from the entry point of the STAR for the destination airport to landing on a runway of the destination airport by processing the third plurality of features of the set of features.

The respective predicted outputs of these predictive units may then be communicated to the processor 20, which may then determine the predicted flight arrival time of the given aircraft flight at the destination airport by adding the predicted time delay of the flight departure time, the predicted time duration of the given aircraft flight from the origin airport to an entry point of a standard terminal arrival route and the predicted time duration of the given aircraft flight from the entry point of the standard terminal arrival route to landing on a runway of the destination airport and the received scheduled departure time of the given aircraft flight from the origin airport as set out in step 38 of FIG. 2. The predicted flight arrival time of the given aircraft flight at the destination airport may then be communicated by the processor 20 to the output interface 22, for outputting to a user display or as an input of an autonomous flight handling system for example. Further detail relating to the respective predictive models and predictive units will be provided on the following sections of the present description.

These predictions may be performed using a state-machine that maintains an in-memory snapshot of all planned and active arrivals for a given destination airport. This state-machine can then be updated in real time based on received aircraft flight position/movement data, filed flight plan data, weather data, and other data that is input into the system via one or more input feeds to an input interface of the method and system of the present disclosure.

The state-machine periodically performs the required calculations for estimating or predicting the time durations of each of the above sub-blocks, which may be identified as timestamps for the various flight milestones of an aircraft flight. When these flight milestones/sub-blocks have been completed, estimated or predicted timestamps are preferably replaced with received timestamps of the actual time the flight milestone was completed, where available, in order to further improve the accuracy of any subsequent predictions.

Predictions for the Previous Flight

The inventors have appreciated that the accuracy of predictions for a given aircraft arrival, can be improved by making similar predictions for the previous flight that the same physical aircraft will have undertaken. Indeed, for most airlines, around 50-60% of departure delays are caused by the inbound delay of the aircraft on its previous flight. Prior to departure of the previous flight, the departure time may be estimated based on a received flight plan. This may be obtained from the airline, from ATC or from third party sources. The received flight plan will contain an estimated departure time at which the aircraft is expected to physically take off. This is known as the OFF event that represents the start of the major airborne flight phase.

Where no flight plan is available for the identified previous flight, the OUT timestamp may be assumed to be the standard scheduled departure time for that flight route, with the OFF timestamp being estimated to be the standard scheduled departure time for that flight plus an average taxi-out time. Depending on the information available for the flight and/or previous corresponding flights, the average taxi-out time may be a generic average taxi-out time for the airport as a whole, the average taxi-out time for previous flights on that route, or the average taxi-out time for a known gate/stand and runway pair.

The major phase prior to the OFF is the taxi-out phase, which begins with the OUT event where the aircraft starts to taxi-out from the gate. Where necessary, an estimated timestamp for the OUT event can be calculated as the estimated timestamp for the OFF event minus an estimated time duration for the taxi-out phase.

Predictions for previous flights have been found to particularly improve the prediction accuracy for arriving flights that are less than 6 hours in duration. Where the arriving flight is a long haul flight of more than 6 hours duration, it may not be desirable to perform these predictions for the previous flight since the improvement in prediction accuracy provided will give a diminishing return by comparison.

Estimated taxi-times have been predicted based on a calculation of the average taxi-time at a given airport using analysis of historical OOOI event timestamps, which may be obtained from airlines, ATC or third party sources. The time difference between the OUT and OFF OOOI event timestamps can be considered to be equal to the taxi-out time.

These taxi-out estimates can be improved by calculating a number of different average taxi-times for the given airport for each day of the week and during different time periods of the day. The averages for taxi-out estimates can be further improved by also calculating different averages for the various terminals and/or gates in the airport from each of the possible runways and/or runway directions. This is because the direction that planes land or take off on the runway may be changed depending on the prevailing conditions and this will change the entry point to or exit point from the runway and thus the taxi time from or to the gate respectively. The average taxi-out times are preferably pre-calculated in a batch and stored in the database for the processor of the system to poll as needed.

A corresponding method may be performed to determine the average taxi-in times for use in estimates. The taxi-in time is the duration of time taken from the aircraft landing on the runway to stopping at the airport gate and can be determined by the time difference between the ON and IN OOOI event timestamps. The average taxi-in times are preferably pre-calculated in a batch and stored in the database for the processor of the system to poll as needed as set out in the following pages.

In an alternative embodiment, or where no pre-calculated taxi-out or taxi-in times have been determined (for example for a particularly rare or unusual airport), a standard taxi-out time of 10 minutes may be used and/or a standard taxi-in time of 5 minutes may be used.

Once the previous flight's OUT and OFF timestamps are predicted, these can then be fed into the ON and IN OOOI event timestamp predictions relating to the estimated time the aircraft will land on the ground and get into the gate respectfully and thus the knock on effect on the subsequent flight of interest can be determined.

The ON timestamp may be estimated to be the OFF timestamp plus the estimated flight time obtained from the aircraft's flight plan, which is calculated by the airline by using flight planning tools for example. The IN timestamp may be estimated to be the ON timestamp plus the taxi-in time, which can be estimated as set out above.

The estimated flight time obtained from the aircraft's flight plan typically does not take into account the impact of the prevailing weather conditions or of congestion as the destination airport on the time spent in the STAR and the additional flight time that this may involve. Accordingly, the accuracy of this estimated flight time could be improved by utilising a machine learning model that is configured and trained to predict en route delays due to weather and/or arrival congestion at the destination; this could be achieved in a similar manner to that described below for predictions relating to the flight of interest.

Predictions for the Flight of Interest

Once the aircraft has landed from its previous flight, there will be a minimum turnaround time that is required in order to prepare the aircraft for the next flight, i.e. the flight of interest with respect to the disruption and delay predictions. This minimum turnaround time is preferably estimated so that the system can predict any departure delay for the flight of interest and the knock on effect this may have on the aircraft's arrival time at the destination airport of the flight of interest. The minimum turnaround time will typically vary by airline, by airport and/or by aircraft; accordingly, estimates are determined for the various combinations of these factors. The minimum turnaround time may also be determined based on historical data, such as OOOI event timestamp data.

In one embodiment, a turnaround time may be determined to be x' where x is the time difference between the OUT timestamp of one flight and the IN timestamp of the previous flight that the same aircraft performed, $\bar{x}$ is the mean average of x and $\sigma$ is the standard deviation of x as follows:

$$x'=\bar{x}-\sigma$$

Any values for x that are over 6 hours may be discarded as these will typically be for overnight turnarounds, which may disrupt the sequence of delays that might otherwise lead to disruption.

The departure time for the flight of interest can then be estimated to be whichever is greater of the scheduled departure time for that aircraft or the sum of the IN timestamp of the previous flight for that aircraft and the estimated minimum turnaround time (for that aircraft/airline/airport combination). This departure delay propagation model works particularly well for long-haul flights.

This departure delay prediction can be further enhanced by using supervised machine learning. In particular, it has been appreciated that the majority of departure delays for aircraft are caused by one or more of the weather conditions, instructions/restrictions from Air Traffic Controllers (ATC), or the propagation of other delays, for example the propagation of a delay that the aircraft in question experienced in a previous flight.

The weather conditions at the origin airport may be considered to be a strong indicator of any likely delays in the flight departure time; however, the skilled person will appreciate that the accuracy of predictions may be further improved by including additional features in the predictive model. The role of ATCs may also be relevant for airports that have implemented Air Traffic Flow Management systems, such as the Federal Aviation Authorities Ground Delay Program, since these programs/system enable ATC to avoid congestion at destination airports by delaying the departure of certain flights from the origin airport.

The applicant has appreciated that these departure delay predictions can be achieved using ensemble learning models of machine learning, such as random forests comprising a set of decision trees or artificial neural networks. When using an artificial neural network, example hyper-parameters are as follows:

Layers: 4 hidden layers of 1000 neurons, 1000 neurons, 500 neurons and 500 neurons respectively;
Batch Size: 256 samples;
Iterations per Epoch: 1;
Number of Epochs 200;
Updater: RMSPROP
Learning Rate: 0.01 initial value (this can be changed automatically by the RMSPROP updater);
Regularization: L2, 0.025;
Momentum: 0.9;
Loss/Error Function: Mean Squared Error (MSE); and
Activation/Transfer Function: Leaky Rectified Linear Units (leaky-RELU) for neurons in the hidden layers, while the activation function is the Identity Function as required for regression models.

In one embodiment, the DeepLearning4j framework may be used with the artificial neural network algorithm.

This machine learning model can be trained using a plurality of samples, each sample representing the observed features/parameters of a single flight and the associated delay, which may be represented as a number of minutes that the actual OFF is after the scheduled departure time.

In one embodiment, a computer implemented method may be provided for training an artificial neural network predictive model to predict a time delay of a flight departure time of the given aircraft flight from the origin airport based on the first plurality of features, the method for training comprising performing the steps of FIG. 3 for each aircraft flight of a plurality of aircraft flights.

Specifically, in step 40 a scheduled departure time of the given aircraft flight, a plurality of samples of airport weather data indicating the weather conditions at the origin airport at respective points in time, a scheduled arrival time of a previous flight of the given aircraft, an actual or estimated arrival delay of the given aircraft at the origin airport from the previous flight of the given aircraft, and an actual departure time of the given aircraft flight from the origin airport are received. Weighed values of the airport weather data samples are then determined based on an intensity of the weather conditions in step 42.

In step 44, a percentage time delay is determined by dividing the actual or estimated arrival delay of the given aircraft at the origin airport from the previous flight of the given aircraft by a time difference between the scheduled arrival time of a previous flight of the given aircraft and the scheduled departure time of the given aircraft flight. In step 46, an actual time delay of the flight departure time is determined by subtracting the scheduled departure time of the given aircraft flight from the actual departure time of the given aircraft flight.

In step 48, the method then applies the artificial neural network to the plurality of features comprising the scheduled departure time of the given aircraft flight, the plurality of samples of airport weather data, the percentage time delay and the actual departure time of the given aircraft flight from the origin airport in order to train the model based on a training data set.

The first plurality of features/parameters are focused on the weather (at the airport of origin, destination airport, or along the route/flightpath), ATC restrictions and the propagation of earlier observed delays. As noted above, these categories of data represent the estimated cause of the majority of delays for departing aircraft.

Weather data may be captured from Significant Meteorological Information AIM 7-1-5 (SIGMET) weather advisories, which are meteorological advisories specifically directed to the safety of aircraft. These may cover weather phenomena identified or forecast in specific areas for given time periods, such as embedded thunderstorms, isolated thunderstorms, squall lines (representing high winds and storms), cumulonimbus clouds (which are accompanied by strong and turbulent upward air currents), turbulence, icing, freezing rain, mountain waves (where the air downwind of mountain peaks is turbulent, with certain areas more prone to icing), dust storms, sand storms, volcanic eruptions, ash Clouds, radioactive clouds, tropical cyclones, terrain obscuration, tornadoes, wind shear, hail, and other weather phenomena.

These advisories may be weighted in the machine learning parameters according to the relative intensity of the weather phenomenon, the length of time/distance between the origin departure time/point and the impacted airspace, the length of time/distance that the flight plan corresponding to the flight indicates the aircraft will travel through the airspace impacted by the weather phenomenon and/or the additional flight distance required to travel around/bypass the area.

As well as these significant meteorological events, other weather data may also be used in the prediction by using data input from METAR weather reports and Terminal Aerodrome Forecast (TAF) data. For example weather snapshots of the actual or forecast change in wind direction (for example the number of degrees change with respect to the snapshot from 30 minutes before), wind speed, wind gust speed, side-wind speed (as a component of the wind vector) across/perpendicular to the most optimal runway, side-gust speed (as a component of the wind vector) across/perpendicular to the most optimal runway, density and altitude of the lowest cloud layer, visibility distance, fog density, and the intensity of thunderstorms, rain, snow, hail, smoke, volcanic ash, dust storms, sand storms and any funnel clouds at the departure airport.

Such snapshots corresponding to 60 minutes before the scheduled flight departure time, 30 minutes before the scheduled flight departure time, the scheduled flight departure time, 30 minutes after the scheduled flight departure time and 60 minutes after the scheduled flight departure time may be used in one example. A corresponding snapshot may also be input into the machine learning model for the weather at the destination airport at the scheduled time of arrival.

ATC restrictions can be modelled based on Notice To All Airmen (NOTAM) advisories or Aeronautical Information Publications (AIPs), which may indicate temporary flight restrictions, closed runways at airports, snow/ice status of runways/taxiways, facilities that are not working (such as navigational aids) and other hazards.

The propagation of earlier delays can be captured by monitoring and recording the delays experienced by the same physical aircraft, that is scheduled to operate the flight in question, on its previous flights. The identity of the physical aircraft can be tracked by using its tail number. The previous few flights could be monitored for the length of delay of an aircraft landing and the impact of this delay as a proportion of the scheduled turnaround time from that physical aircraft landing and then taking off again. For example, where an aircraft is scheduled to land and then take off again 2 hours later, but the aircraft is delayed and lands an hour late, the proportion of the delay may be considered to be 50%. The higher the percentage of this proportional delay, the more likely it will be/more severely that the delay of the previous flight has a knock on effect and delays the departure of the following flight. In one embodiment, the previous four flights may be monitored.

Other characteristics such as the airline operating the flight, the origin and destination airports for the flight, whether the flight is domestic, international or intercontinental (which can be determined automatically using ICAO codes for the relevant airports), the time and day of the week that the flight is intended to depart; the scheduled flight time (air time duration from the flight plan for example), whether the scheduled departure time is in daylight hours or not, and average delay times for the flight number and route in question may also be taken into consideration by the machine learning algorithm. For the avoidance of doubt, it is noted that a flight number typically corresponds to the flight from a given origin to a given destination on a given day of the week, whereas the statistics for the route would also include corresponding flights on other days of the week.

Characteristics of the physical aircraft operating the flight may also be taken into consideration, such as the relative size of the aircraft and the relative amount of wake/the size of the wake vortex that such an aircraft would generate. Other examples include statistics linked to the aircraft, such as the average delay times for the specific physical aircraft and average delay times for that type of aircraft.

Where airports have multiple terminals, an identification of the scheduled terminal of arrival for the preceding flight of the specific aircraft and the scheduled departure terminal for the flight in question may also further improve the prediction of any departure delay for the aircraft/flight.

Windowed averages of the typical number of arrivals and departures at the airport for a number of intervals per day may also improve departure delay estimates by taking into account the traffic volumes and congestion at the airport throughout the week and throughout the day. Congestion values for arrival/departure time windows closer to the scheduled arrival of the previous flight and departure of the flight in question may be weighted more than those windows that are further away in time.

Similar information arrivals congestion information at the destination airport may be beneficial in cases where Air Traffic Flow Management systems, such as the Federal Aviation Authorities Ground Delay Program, are in effect since ATC may delay the departure of flights from the origin airport in order to spread out the arrivals at the departure airport more evenly if the departure airport is congested. The impact on departing flights depends on thresholds of the throughput for the destination airport, which in turn depends on factors such as the weather and runway operational capacity at the destination airport at the relevant point in time. Shorter flights are typically the most impacted by these delays and thus the distance from the origin to the destination airports, the total number of flights scheduled to land in a time window including the scheduled arrival time of the aircraft in question and the relative position of the aircraft in question will be relevant features for consideration of delays enforced by Air Traffic Flow Management systems.

For implementations using an artificial neural network, the training and validation accuracy are output for each epoch, including average prediction error in minutes, lowest prediction error in minutes (per minibatch) and highest prediction error in minutes (per minibatch). During the early stages of training, both the training accuracy and the validation accuracy should increase over time. During the later stages of training, the training accuracy will continue to increase but the validation accuracy will start to deteriorate; the training process should be terminated at this stage.

Flight Phase

The period during which the aircraft is in the air can be divided into two intervals, the first extending from the time of take off until the point of entry into the STAR and the second extending from entry into the STAR until the touchdown time on the airport runway. As noted above, STAR stands for the Standard Terminal Arrival Route, which is a flight route set by the Air Navigation Service Provider (ANSP) responsible for the airspace around the airport so as to standardise the transition between the flight's en route phase and the approach phase.

Depending on the airspace region and the airport, a given STAR may feed into a specific runway or may feed into a plurality of runways, the STAR may also have a plurality of entry points. As will be appreciated, the STAR entry point to be used will impact the time to STAR flight time en route from the point of take off until entry into the STAR. The STAR entry waypoint is typically chosen by the pilot or whoever performs the flight planning on the pilot's behalf. The flight plan is designed to lead the pilot to this STAR entry waypoint, after which Air Traffic Control (ATC) instructions provide the appropriate onwards flight trajectory, taking into account the runway landing direction in use at that point in time.

Some airports use many different STARs and so it will greatly improve the accuracy of the flight time predictions if an accurate prediction of the STAR that will be used in a given set of circumstances is possible.

Various factors may be considered when determining which STAR will be used, for example which STAR has an initial waypoint that is closest to one of the last waypoints of the aircraft's flight plan. Alternatively, if flight plan data is not available then a known and most commonly used STAR for a given airline operating from a given origin airport may be used. As the flight nears the airport, the estimated STAR may alternatively or additionally be determined to be that with a STAR entry point (on the near side of the airport) closest to the projected flight path based on the aircraft's current bearing or by proximity of the aircraft to an inclusion zone of a given STAR. Inclusion zones may be defined for STAR routes that are otherwise difficult to predict.

Time to STAR Prediction

The time to STAR is the duration of time between the aircraft taking OFF and the aircraft entering the STAR, accordingly the actual or predicted OFF timestamp and the predicted STAR and STAR entry point for the flight may be used as input data for the time to STAR prediction.

The inventors have appreciated that predictions of the time to STAR can be improved by utilising predictions based on machine learning methods, in particular ensemble learning models such as using random forests comprising a set of decision trees or using artificial neural networks. When using a random forest prediction model with a set of decision trees, each having an equal vote for the prediction, example hyper-parameters are as follows:

Maximum Depth: 30;
Maximum number of Bins: 256;
Number of Decision Trees: 25;
Number of Features per Tree/Split: Square root of total number of features; and
Impurity: Variance.

In one embodiment, the Apache Spark framework may be used with the random forest ensemble learning model algorithm.

When using an artificial neural network, example hyperparameters are as follows:
- Layers: 2 hidden layers of 500 nodes each;
- Epochs: 500;
- Iterations per Epoch: 1;
- Updater: ADAM, with initial momentum 0.9;
- Learning-Rate: 0.01 (this initial value may optionally be updated automatically, for example by an ADAM optimisation algorithm);
- Activation Function: Leaky-RELU for hidden layers, Identity for output layer;
- Loss Function: Mean Squared Error (MSE);
- Batch-Size: 512 samples; and
- Regularisation: L2, 0.001.

In one embodiment, the DeepLearning4j framework may be used with the artificial neural network algorithm.

The data elements used for the second plurality of features of the time to STAR machine learning training and prediction may include the distance from the origin airport to the destination airport, the selected STAR and actual route to be followed as identified by the waypoints in the flight plan, the type of the aircraft and/or its rated cruise speed (Mach-number), and the headwind/tailwind weather predictions along the flight path.

Because the length of the time to STAR is a large part of the total journey time of an aircraft, the time to STAR prediction will typically be recalculated and updated a number of times before and during the flight. Once a given flight has taken off from the airport of origin, the predictions may then take into account the most recent location information of the given aircraft and instead predict the length of time from the current aircraft location to the STAR rather than from the origin airport. In a similar manner, it is desirable to train the machine learning model with a plurality of data snapshots corresponding to each flight at different points in time, for example a certain amount of time before the scheduled departure, at the departure time, and then periodic snapshots throughout the time to STAR flight phase, which may increase in regularity (shorter period/time between snapshots) towards the end of the time to STAR flight phase.

Figure 4B:
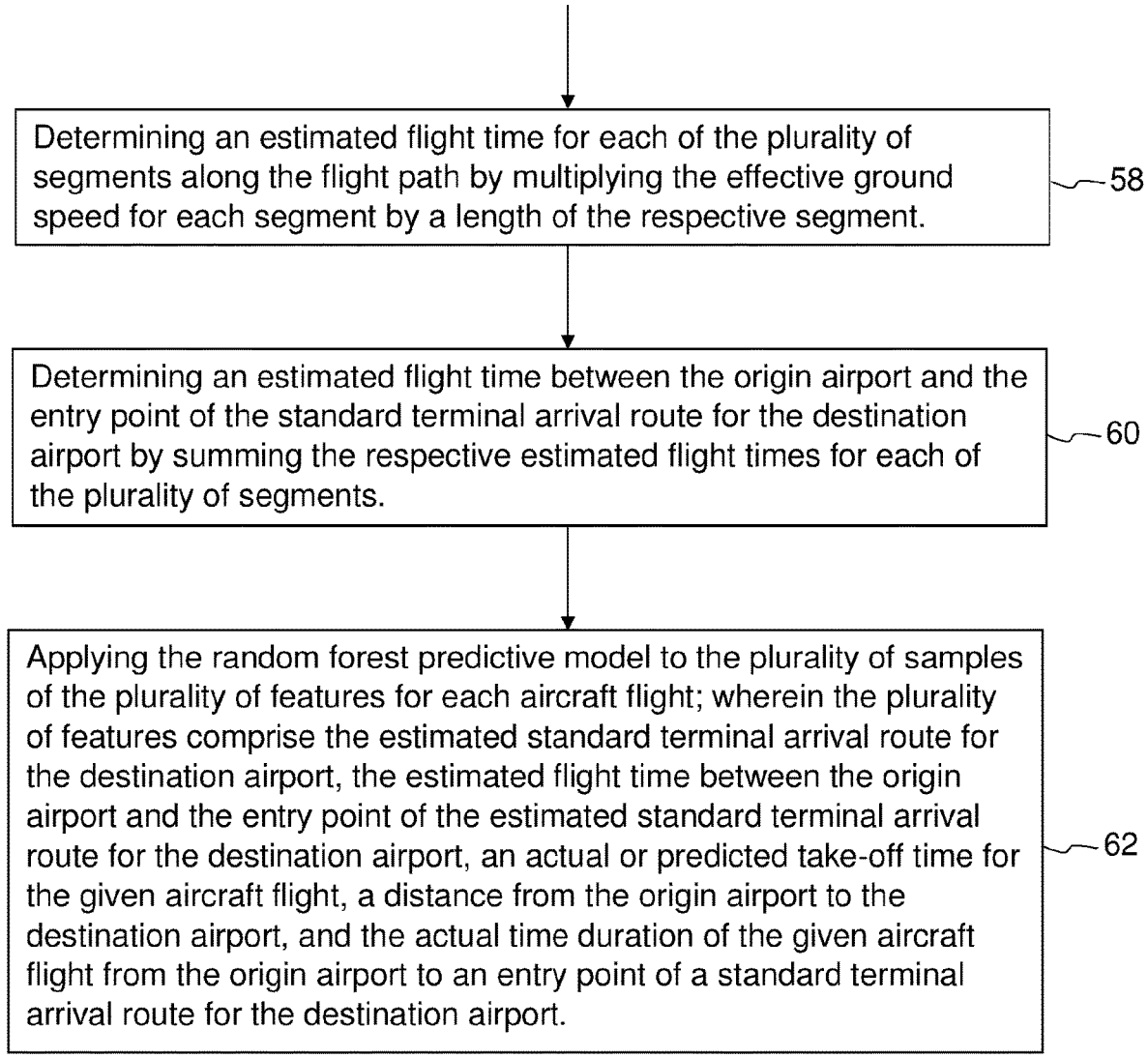

In one embodiment, a computer implemented method may be provided for training a random forest predictive model to predict a time duration of the given aircraft flight from the origin airport to an entry point of a standard terminal arrival route for the destination airport based on a plurality of features, the method for training comprising performing the steps of FIGS. 4A and 4B for a plurality of samples of the plurality of features of each aircraft flight of a plurality of aircraft flights.

Specifically, in step 50 a rated cruise speed of the given aircraft and an expected cruising altitude for the given aircraft flight, a flight plan route comprising a plurality of waypoints indicating a flight path for the given aircraft flight, a plurality of tail-wind speed predictions corresponding to a plurality of segments of the flight path between the origin airport and the entry point of the standard terminal arrival route for the destination airport at the expected cruising altitude, and an actual time duration of the given aircraft flight from the origin airport to an entry point of a standard terminal arrival route for the destination airport are received.

In step 52, an estimated average air speed is determined based on the recommended/rated cruise speed of the aircraft type (provided by the aircraft manufacturer) as a percentage of the speed of sound (Mach number) and scaling this by the expected cruising altitude extracted from the filed flight plan. This is because the speed of sound varies at different altitudes due to the different densities of the atmosphere. The speed of sound in knots may be taken to be:

$$\text{Speed of sound (knots)} = 29.06 * \sqrt{518.7 - 3.57 * \frac{\text{altitude in feet}}{1000}}$$

The air speed of the aircraft in knots can then be taken to be:

$$\text{Air speed (knots)} = \text{Mach number} * \text{Speed of sound (knots)}$$

where the Mach number is the manufacturer rated cruise Mach number as set out above. The air speed can be converted from knots to m/s by multiplying by approximately 0.514444.

In step 54, an estimated standard terminal arrival route for the destination airport may be determined to be the standard terminal arrival route with an entry waypoint that is closest in distance to the final waypoint of the flight plan route. By identifying an estimated STAR to be used by the given aircraft, the flight path of the given aircraft can be identified more accurately. This flight path may then be divided up into a plurality of segments and an effective ground speed determined for each segment of the flight path.

The effective ground speed is calculated in step 56 as the estimated average air speed plus the tail-wind speed prediction, which may be a negative value if there is a head-wind, for that segment of the flight path. Tail-wind/head-wind values may be obtained from published winds aloft data feeds, which contain the wind direction and strength/speed at different altitudes for certain latitude and longitude points.

In one example, the flight path may be broken down into segments (e.g. of 100 km or less if the flight plan waypoints are closer than 100 km) and for each segment the distance between the start and end of the segment, the aircraft air speed and the effective ground speed may be determined. In step 58, the method may then determine an estimated total flight time (e.g. number of seconds flight duration between the start and end of the segment) for each segment based on the segment distance and estimated effective ground speed and a total estimated flight time may be determined in step 60 by summing the flight time for each of the respective segments of the flight path.

Finally, in step 62 the method then applies the random forest predictive model to the plurality of samples of the plurality of features for each aircraft flight comprising the estimated standard terminal arrival route for the destination airport, the estimated flight time between the origin airport and the entry point of the estimated standard terminal arrival route for the destination airport, an actual or predicted take-off time for the given aircraft flight, a distance from the origin airport to the destination airport, and the actual time duration of the given aircraft flight from the origin airport to an entry point of a standard terminal arrival route for the destination airport in order to train the model based on a training data set.

In the initial segment, starting from take-off, the time duration may preferably take into account that the aircraft will be climbing from ground level to the cruising altitude. As such, the time duration for this segment will preferably take into account an expected climb rate and any air speed limits imposed at certain altitudes, on the assumption of an unimpeded ascent with no detours. This can then be input into the machine learning algorithm/model in order to modify for any anticipated detours/delays as will be appreciated by the skilled person.

A range of features may be included to represent other arrivals bound for the same destination airport. These features are based on an estimated on-approach time calculated as the estimated ON timestamp from the fight-plan minutes the average time-in-STAR for the arrival's designated STAR. For each possible STAR at a destination airport, the number of arrivals estimated to be entering the STAR within a series of time windows (which may be consecutive) with respect to (before, after, or around) the estimated STAR entry for the flight in question may be entered as a feature.

The length of time between the estimated on-approach time of the flight in question and the immediately preceding and following aircraft may also be recorded as features, with the relative size of these two aircraft and their rated wake also being recorded as features. The rated wake is an indication of the size of the wake vortex created behind an aircraft. Depending on the size of a second aircraft following the first aircraft and the size of the wake vortex created behind the first aircraft, a minimum spacing/separation distance will be required to be maintained between the two aircraft in order to avoid negatively impacting the flight stability of the second aircraft. This places a limitation on the number of aircraft that can occupy a given airspace and accordingly the combined wake separation required for each pair of aircraft with estimated on-approach times falling within a window in advance of the flight in question may also be included as a feature of the second predictive model.

Some additional features may be created to contain an estimated overall flying time (from the flight-plan) or an estimated remaining flying time. These durations are based on an adjusted estimate of the ON using the actual or estimated OFF and the estimated duration of the flight. The last recorded position (in 4D space-time) may also be used with the adjusted estimate of the ON to determine an estimated remaining flying time.

Based on the most recently recorded position of the aircraft, the distance already travelled, as a percentage of the total distance from origin to destination, can be determined. The respective distances from the origin airport to the destination airport and from the origin airport to the entry waypoint of the designated STAR at the destination airport may also be included as further features. These distances can either be calculated using the great circle distance from one point to another, or by using planned waypoints identified from the flight plan filed.

Further relevant parameters once again include weather data for the origin airport, the destination airport, or along the flight route, which may be captured from Significant Meteorological Information AIM 7-1-5 (SIGMET) weather advisories to cover the weather phenomena listed above as well as METAR weather reports and Terminal Aerodrome Forecast (TAF) data. Depending on the type of weather event, the pilot may fly at a lower flight speed through the affected area, divert around the affected area, or travel through the affected area avoiding the most severe spots of the weather event.

Samples may also be marked with features specifying the day of the week, time of day (e.g. morning, day, evening or night) and daylight status (i.e. either in daylight or darkness) of the scheduled departure and arrival of each aircraft. NOTAMs relating to closed airspace along the flight path may also be relevant as the pilot will be required to navigate around such closed airspace.

Characteristics of the physical aircraft operating the flight are once again beneficial to the accuracy of a machine learning prediction. These include the relative size of the aircraft and the relative amount of wake that such an aircraft would generate as discussed above. Other characteristics such as the identity of the airline operating the flight, the origin and destination airports for the flight, whether the flight is national, international or intercontinental (which can be determined automatically using ICAO codes for the relevant airports) may also further improve the accuracy of the predictions of the predictive model.

Moreover, flights that have been diverted to the destination airport from a different airport can preferably be flagged in a feature, since these flights typically do not follow the same flight path as non-diverted flights and may be given priority by ATC, for example taking into account the remaining fuel levels of the aircraft.

Windowed averages of the typical number of arrivals at the airport for a number of intervals per day may also improve time to STAR estimates by taking into account the traffic volumes and congestion at the destination airport throughout the week and throughout the day. Congestion values for arrival time windows closer to the scheduled arrival of the previous flight and departure of the flight in question may be weighted more than those windows that are further away in time.

Possible congestion at the destination airport at estimated time of arrival, which may cause delays and/or reduction of air speed en route, can be captured in features based on the distance from the aircraft to the destination airport, the number of flights scheduled to arrive at the destination airport within a given window and the order of the aircraft in question with respect to the other aircraft that are scheduled to land at a similar time. Additionally, the runway capacity at the estimated ON time for the aircraft can be estimated based on the information in NOTAMs and AIPs, for example as a percentage of the theoretical maximum runway capacity.

During training of the machine learning model, the accuracy of the time to STAR model can be measured in a live fashion, for example by monitoring the accuracy of each predicted ON approach timestamps vs the actual ON approach timestamps (effectively testing the accuracy of the departure delay model and time to STAR model together), monitoring the accuracy of the overall time to STAR predictions, and monitoring the accuracy of the prediction of the remaining time from the current aircraft position to the STAR.

Runway and Time in STAR Prediction

The time in STAR is considered to be the duration of time between the aircraft passing the initial waypoint of the STAR and touchdown on the runway, and thus covers the STAR route, the transition and the final approach.

The STARs are each used to safely funnel arrivals into a sequence of landings on the runway(s) in use. The STARs are typically organised to funnel flights to one of a plurality of final feeder fixes or waypoints (for example, waypoints that are North, East, South and West of the airport respectively), and from there to one of the runways.

The time in STAR may depend on factors such as airport congestion, the available runways, weather conditions and the flight and aircraft details. The inventors have appreciated that predictions of the time it takes for an aircraft to complete its STAR arrival route and to land on the runway (ON time) can be improved by utilising predictions based on machine learning methods, in particular ensemble learning models such as using random forests comprising a set of decision trees, using gradient boosted decision trees, or using artificial neural networks. When using an artificial neural network, example hyper-parameters are as follows:

Layers: 3 hidden layers of 1000 nodes each and a final output layer with a single node;
Number of Epochs: 250;
Iterations per Epoch: 1;
Updater: ADAM;
Momentum: 0.9;
Learning-Rate: 0.01 initial value (this is changed automatically by the ADAM updater);
Activation Function: Leaky Rectified Linear Units h(Leaky-RELU) for hidden layers, Identity function for the output layer;
Loss Function: Mean Squared Error (MSE);
Batch-Size: 512 samples; and
Regularization: L2, 0.05; and
Dropout: 0.75 (25% of weights are cleared after each epoch).

When using a random forest prediction model, example hyper-parameters are as follows:

Depth: 30;
Bins: 256;
Trees: 75;
Number of Features per Tree: Square root of total number of features; and
Impurity: Variance.

The data elements used for the features of the time in STAR machine learning training and prediction may include the aircraft type, relative size and the amount of wake turbulence due to the size of the wake vortex of the aircraft trail. This is because minimum spacing distances between aircraft are required for safety and the minimum spacing distance for a given pair of aircraft is based on the relative size of the two aircraft, which determines the size of the wake vortex created by the aircraft in front, and the impact this wake vortex has on the aircraft behind. For instance, the spacing distance required for a LearJet following an A380 is very large (since the A380 is large and will create a large wake vortex and the LearJet is small and not well able to cope with wake vortexes), while the distance required for an A380 following a LearJet is very small. This distance may be known as the wake spacing or wake separation that is required for a given pair of aircraft.

Aircraft wake is given on a scale of "light" (for light aircraft), "medium" (for medium aircraft such as a Boeing 737 or an Airbus A320), "heavy" (for larger aircraft such as a Boeing 747 or an Airbus A330), and "super" (for the heaviest aircraft, which typically only includes the Airbus A380 for passenger aircraft). An example of a corresponding required spacing is shown in the below table in Nautical Miles:

|  |  | Aircraft in Front | | | |
| --- | --- | --- | --- | --- | --- |
|  |  | Light | Medium | Heavy | Super |
| Aircraft Following | Light | 3 NM | 5 NM | 6 NM | 8 NM |
|  | Medium | 3 NM | 3 NM | 5 NM | 7 NM |
|  | Heavy | 3 NM | 3 NM | 4 NM | 6 NM |
|  | Super | 3 NM | 3 NM | 4 NM | 4 NM |

Figure 5:
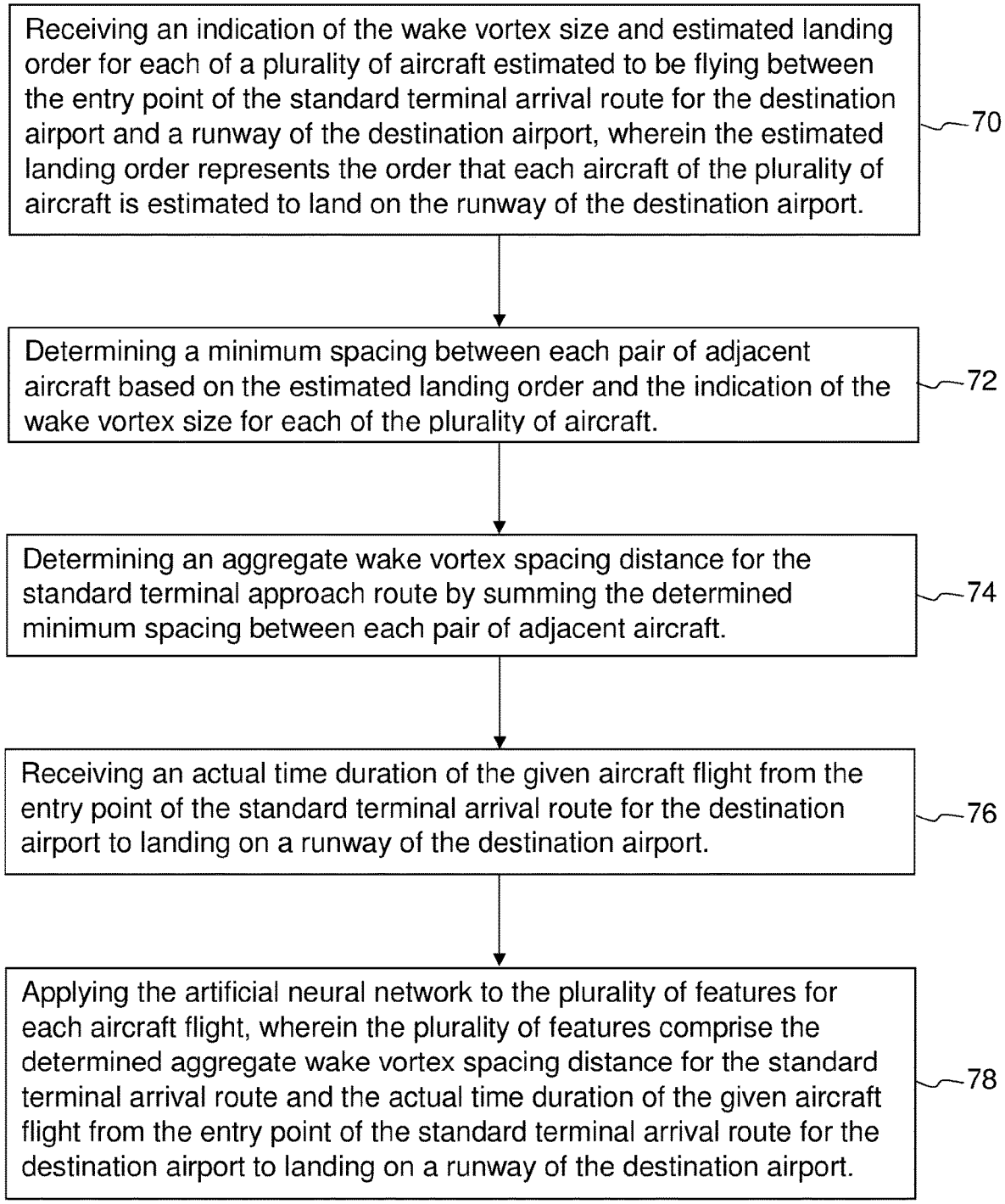
FIG. 5 is a flowchart of a method for training a predictive model to predict a time duration of a flight from the entry point of the standard terminal arrival route to landing on a runway at a destination airport according to a fourth aspect of the present disclosure.

In one embodiment, a computer implemented method may be provided for training an artificial neural network predictive model to predict a time duration of the given aircraft flight from the entry point of the standard terminal arrival route for the destination airport to landing on a runway of the destination airport based on a plurality of features, the method for training comprises performing the steps of FIG. 5 for each aircraft flight of a plurality of aircraft flights.

Specifically, in step 70 of FIG. 5 an indication of the wake vortex size and estimated landing order for each of a plurality of aircraft estimated to be flying between the entry point of the standard terminal arrival route for the destination airport and a runway of the destination airport is received, wherein the estimated landing order represents the order that each aircraft of the plurality of aircraft is estimated to land on the runway of the destination airport. This may then be used to determine a minimum spacing between each pair of adjacent aircraft based on the estimated landing order and the indication of the wake vortex size for each of the plurality of aircraft as set out in step 72.

In step 74, an aggregate wake vortex spacing distance is determined for the STAR by summing the respective determined minimum spacing between each pair of adjacent aircraft. In step 76 an actual time duration of the given aircraft flight from the entry point of the STAR for the destination airport to landing on a runway of the destination airport is received; and finally in step 78 the method then applies the artificial neural network to the plurality of features for each aircraft flight, wherein the plurality of features comprise the determined aggregate wake vortex spacing distance for the standard terminal arrival route and the actual time duration of the given aircraft flight from the entry point of the standard terminal arrival route for the destination airport to landing on a runway of the destination airport.

ATC will manage merging flows of aircraft in the STARs to ensure safe spacing between aircraft. The techniques used by ATC all involve measures to control the relative spacing between aircraft; however, regulations for aircraft in STAR patterns typically require aircraft to maintain a steady air speed and so the relative spacing is instead typically controlled by adjusting the distance flown by each aircraft. For example, an aircraft may be instructed to skip a STAR waypoint and head for the following waypoint in order to reduce a spacing to the aircraft in front, or to increase the spacing by taking the aircraft on a meandering (zig-zag)/circular (e.g. holding stack) path rather than following a straight line.

Similarly, the volume of arrivals will typically have a large role to play and may impact when ATC need to apply such spacing measures. Generally, the larger the number of arrivals the longer the time in STAR will be, in particular when there are a large number of arrivals in the same STAR as an aircraft in question.

A wide range of features may be used to describe the congestion within the STARs, including the number of aircraft, how closely grouped they are, and the required separation based on wake vortex size. The arrivals are first grouped by the identified STAR and secondly by their on-approach time. Various factors may be considered when determining which STAR will be used, for example which STAR has an initial waypoint that is closest to one of the last waypoints of the aircraft's flight plan. Alternatively, if flight plan data is not available then a known and most commonly used STAR for a given airline operating from a given origin airport may be used. As the flight nears the airport, the estimated STAR may alternatively or additionally be determined to be that with a STAR entry point (on the near side of the airport) closest to the projected flight path based on the aircraft's current bearing or by proximity of the aircraft to an inclusion zone of a given STAR.

Inclusion zones may be defined for STAR routes that are otherwise difficult to predict. Relevant features in this regard will include an indication of which STAR, runway pair or group and final feeder fix for the airport will be used by the aircraft in question, as well as the average (e.g. mean, median and/or standard deviation) time in STAR for the STAR that is determined to be used.

A feature containing the aggregated wake spacing required for all arrivals entering a given STAR during a given time window may be determined for a plurality of time windows around the estimated time of STAR entry of the flight in question, as well as the aggregate wake spacing for all aircraft known or estimated to be in each STAR at that time. The relative aircraft size and wake vortex size of the aircraft entering the STAR before and after the aircraft in question, as well as the length of time between these aircraft entering the STAR respectively and the aircraft in question entering the STAR may also be used as a feature for the time in STAR model.

For each final feeder fix, a combined congestion score based on the required spacing between each aircraft in the time window, which is calculated based on the combination of the wake vortex size for the aircraft in front as well as the aircraft behind, is determined for a plurality of time windows around the predicted STAR entry time of the aircraft in question. An aggregate combined congestion score for all of the final feeder fixes together may also be used as a feature.

The number of arrivals entering STARs in a given window before the aircraft in question enters its STAR and the altitude that the aircraft in question is at when entering its STAR may also be included as features for the model. Average departure and arrival traffic volumes at the destination airport for a plurality of time windows around the scheduled time and day of the week of arrival for the flight in question may also be used to provide typical congestion data to the model.

Arrival delays earlier in the day may impact the current situation, due to resource contention and departure delays; as such, data on the number of previous arrivals delays of various severity may be included with a feature for each of a plurality of windows in advance of the scheduled landing, estimated ON, time. For example, each window may identify the number of arrivals delayed by more than 15 minutes, more than 30 minutes, more than 60 minutes and more than 120 minutes.

The more runways that are available for landing aircraft, the larger the throughput of arrivals that will able to be handled. Information from NOTAMs and AIPs may be used to determine the runway capacity and airspace limitations near the destination airport at an estimated time of arrival for the aircraft in question. A runway is deemed unavailable for landing when the active AIP document may identify a scheduled runway outage, a NOTAM may identify an unscheduled runway outage, or the NOTAM may specify an unscheduled outage of low visibility landing facilities with other features indicating a low visibility condition (for example that the current time window is during darkness hours or the weather features indicate low visibility).

Airspace limitations are based on a combination of AIP information (definition of an airspace region/polygon) and NOTAM information (activation of the restricted airspace with effective to/from dates and times). These regions of airspace are typically identified by a sequence of longitude and latitude coordinate pairs in order to define a polygon. If it is determined that the polygon intersects, or otherwise affects a given STAR, then this may be recorded as a further feature for the machine learning model. In some embodiments, airspace unique IDs referenced in NOTAMs are used instead of polygon definitions, since this eliminates the need for the polygon information from AIPs to be parsed in order to be interpreted, thus improving the efficiency of the processing of these features.

The relevant features input into the model for training may include indications for each runway specifying if the runway is available during a given time window and the length of time between runway closure and the given time window as well as the time until the runway became available again. The percentage of the total number runways that are operational during a given window may also be recorded as a feature. The samples may also be labelled with an indication of whether the whole airport was closed during the time window and the length of time between airport closure and the given time window as well as the time until the airport was reopened.

Changes to runway configuration introduce a temporary pause in arrival flow. All arrivals on final approach are allowed to land using the current/old configuration, while all other arrivals are placed in holding patterns. Once all arrivals on final approach have landed, the remaining aircraft are vectored to the new runway(s). This pause in flow can be significant, upwards of 15 minutes, hence features indicating the number of minutes since the last change in runway configuration are preferably included in the machine learning model.

Features may also be determined for the estimated number of minutes of flying time between (estimated or actual) take-off (the OFF timestamp) and the (estimated or actual) entry into a STAR as well as the difference between the number of minutes scheduled for the flight and the number of minutes flying time between OFF and the entry into the STAR. If the value of the difference shows that the estimated or actual flying time has exceeded that scheduled, then it may be determined that the aircraft is likely starting to run low on fuel and accordingly that the aircraft may be given priority for landing by ATC.

Weather may also have an impact on both the spacing of aircraft on the runway (wet runways require additional spacing on final approach), and may also limit concurrent approaches on parallel runways. In particular, it is noted that, for airports with multiple parallel runways a single runway only might be used if there was a strong side-wind, whereas if the side wind was not as strong (or there was another relevant weather impact, such as limitations on visibility) then aircraft might be allowed to land on both runways but with the landings staggered and alternating. Alternatively, if the weather was sufficiently good then simultaneous parallel approaches of aircraft on the parallel runways may be utilised, thus providing a significant improvement to the capacity of the runway configuration of the airport during such conditions.

Relevant parameters in this regard once again include weather data for the origin airport, the destination airport, or along the flight route, which may be captured from Significant Meteorological Information AIM 7-1-5 (SIGMET) weather advisories to cover the weather phenomena listed above as well as METAR weather reports and Terminal Aerodrome Forecast (TAF) data. Depending on the type of weather event, the pilot may fly at a lower flight speed through the affected area, divert around the affected area, or travel through the affected area avoiding the most severe spots of the weather event.

SIGMET areas are also matched up with the waypoints defined by each of the airport's STARs, and for each possible STAR the percentage of the waypoints in the STAR that are covered by any SIGMET area is determined. A further feature may also identify whether the final feeder fix of the STAR is within a SIGMET area.

Other relevant weather features, which can be obtained by analysing METAR and TAF data, are by how many degrees the wind direction has changed in the last x minutes (for example 30 minutes) the wind speed and gust speed, the cross-wind speed across the most optimal runway, the side gust speed across most optimal runway, the altitude and density of the lowest cloud layer, the visibility of the airport ground in meters, and the intensity of any thunderstorm, fog, rain, snow, hail, volcanic ash, smoke, dust storm, sand storm and funnel cloud intensity. These features may be predicted for the current time window and one or more future time windows.

Other features, such as the identity of the airline operating the aircraft in question, the origin airport for the flight, whether the flight has been diverted from a different destination airport and whether the flight is national, international, or intercontinental may also be included. Features specifying the current day of the week, the hour of the day and whether it is currently daylight hours may also improve the time in STAR predictions.

The inventors have further appreciated that the time the aircraft will spend in the STAR will depend in part on the runway configuration that is in use at that point in time and that this configuration can contribute to a change in the average amount of time spent in the STAR of around 10 minutes.

As such, the inventors have appreciated that a reliable prediction of the likely runway configuration that will be in use for a given airport in a given set of circumstances can improve any predictions of the length of time than an aircraft will spend in the in STAR phase.

In one embodiment, a computer implemented method may be provided for training an artificial neural network predictive model to predict an estimated runway configuration of the destination airport at a given moment in time by performing the steps of FIG. 6. Specifically, in step 80 a predicted wind vector at a location of the destination airport is received for each of a plurality of time windows, and a plurality of known past runway configurations, each identifying the availability and landing direction of each runway of the plurality of possible runways of the destination airport during a plurality of time windows in the past are also received.

In step 82, a tail wind speed component parallel to the longitudinal axis of the runway is determined for each runway of the plurality of possible runways of the destination airport based on the predicted wind vector for each of the plurality of time windows. In step 84, the method then applies the artificial neural network to the plurality of known past runway configurations and the determined tail wind speed component parallel to the longitudinal axis of the runway for each runway of the plurality of possible runways to estimate a runway configuration of the destination airport during a next time window in the future.

The estimated runway configuration of the destination airport during the next time window in the future is then added as a feature of the predictive model and the process is iteratively repeated for the new next time window in the future as set out in step 86 of FIG. 6.

The runway configuration may depend on a combination of a number of factors, such as the wind direction and speed (since cross-winds and tail winds are typically avoided where possible due to the impact on the stability of the aircraft and touchdown ground speed), desired noise abatement (since where possible, aircraft typically approach airports to land over residential areas at night and in the early morning as opposed to taking off over said areas, since the noise of a departing aircraft is significantly higher than the noise of arriving aircraft), severe weather that may prevent flights from approaching from a given direction, the time since the last runway direction change (since changes in runway direction disrupt arrivals for approximately 10 to 15 minutes and so it would not be desirable for successive runway direction changes to be executed within a short period of time), or the current traffic volume (where possible the runway direction is not changed during periods with high arrival traffic due to the increased amount of disruption this would cause).

Accordingly, the inventors have appreciated that predictions of the landing runway configuration and direction for a series of different time windows can be made by chaining predictions from machine learning methods, in particular using ensemble learning models such as using artificial neural networks. An artificial neural network prediction model may use the following example hyper-parameters:

Layers: 4 hidden layers of 1000, 1000, 500, 500 neurons, and a final output layer with one node per runway pair/group at the airport (each output node signals if the runway is likely to be used for the time-period the training sample represents);

Number of Epochs: 1000;

Iterations per Epoch: 1;

Updater: RMSPROP;

Momentum: 0.9;

Learning-Rate: 0.01 (this initial value may optionally be updated automatically, for example by an RMSPROP optimisation algorithm);

Activation Function: Leaky Rectified Linear Units (Leaky-RELU) for all layers, including the output layer;

Loss Function: Mean Squared Error

Batch size: 64 samples; and

Regularisation: L2 0.01.

The direction of the wind in comparison to the axis of each runway is typically a good identifier of whether a runway will be in use at a given moment in time. This is because headwind is a desirable characteristic for landing an aircraft; in contrast, tailwinds result in a faster groundspeed at touchdown and longer braking times while cross-winds increase the risk of wingstrike and other landing difficulties. The wind vector may be decomposed into a head wind speed value for each runway, where the value is positive if the wind would be fully or partially blowing against the aircraft during landing or take-off from that runway in a given direction, zero if the wind is perfectly perpendicular to the runway, and negative if the wind would be fully or partially blowing with (tailwind) the aircraft during landing or take-off.

Other relevant weather features, which can be obtained by analysing METAR and TAF data, are by how many degrees the wind direction has changed in the last x minutes (for example 30 minutes) the wind speed and gust speed, the cross-wind speed across the most optimal runway, the side gust speed across most optimal runway, the altitude and density of the lowest cloud layer, the visibility of the airport ground in meters, and the intensity of any thunderstorm, fog, rain, snow, hail, volcanic ash, smoke, dust storm, sand storm and funnel cloud intensity. These features may be obtained for the current time window and predicted for one or more future time windows.

Information in NOTAMs and AIPs may be used to determine the runway capacity during the sample's time window, for example the active AIP document may identify a scheduled runway outage, a NOTAM may identify an unscheduled runway outage, or the NOTAM may specify an unscheduled outage of low visibility landing facilities with other features indicating a low visibility condition (for example that the current time window is during darkness hours or the weather features indicate low visibility).

As noted above, the landing air traffic volume is also a factor in whether the runway configuration will change, and so another desirable feature for a runway configuration machine learning prediction engine is the number of arriving aircraft expected in the time window in question, with adjacent time windows also being relevant.

Since the runway configuration typically remains the same for an extended period of time, rather than regularly changing, the previous time window's (predicted or actual) runway configuration is included as a feature for the current time window prediction as well as the number of minutes since the last change in the runway configuration. The day of the week, the hour of the day, and whether it is daylight hours or not are also recorded as features for use in the runway configuration machine learning model.

For training the model, flight data can be grouped into flights that landed within a given time window and a single sample created to represent the airport state during that time window, with labels being used to represent the runways that were actually in use during that time window. In this manner, the state of the airport at that time is represented by the sample, rather than any particular flight. The runways in use may be determined by considering the final position records of each arrival. The result of this determination may additionally be validated through coded logic that identifies permitted runway configurations for a given airport. If the sequence of runway configurations identify that the runway configuration was transitioning during a given window, which might otherwise be identified as an invalid runway configuration, then the time window may preferably be labelled with the runway configuration that the airport is transitioning into.

The relevant features input into the model for training may include indications for each runway specifying if the runway is available during a given time window and the length of time between runway closure and the given time window as well as the time until the runway became available again. The samples may also be labelled with an indication of whether the whole airport was closed during the time window and the length of time between airport closure and the given time window as well as the time until the airport was reopened.

In an alternative implementation of the runway prediction model, the recent historical arrivals are first processed to determine the runway configuration for a plurality of recent time windows—this includes the runways in use per historical time window as well as an identification of when the runway configuration last changed. Then, the results of these recent time window runway configurations are input into the runway prediction machine learning algorithm along with a combination of the above features in order to determine a runway configuration for the next time window (i.e. from the current time onwards for the duration of the window). The results from the current window are then used as an input for the runway configuration prediction for the next time window and this process iterates for each subsequent time window.

In one example implementation, the windows correspond to 15 minute periods. The recent historical arrivals may represent the arrival runway configurations over the last 6 hours and the prediction may be calculated forwards for the next 24 hours. Although any error predictions are compounded in this iterative process of chaining predictions, the model maintains low error levels and so the compounded errors are typically still within manageable levels at the 24 hours out window.

While the runway configuration may identify that a plurality of runways are in use for arrivals at an airport at a given moment in time, it is still possible to identify the most likely runway that a given flight will use based on the known, or predicted, STAR that the flight in question will use from those runways that are available using coded logic to assign the flights based on rules specific to a given airport. This further information can be used to allocate arriving flights to specific runways, which in turn can be used to refine the prediction of the amount of time that the aircraft will spend in the in STAR phase.

Taxi-In Time Prediction

The taxi-in time is the amount of time between the aircraft touching down ON the airport runway and the aircraft parking at a stand or gate (IN). The inventors have appreciated that predictions of the taxi-in time can be improved by utilising predictions based on machine learning methods, in particular ensemble learning models such as using random forests comprising a set of decision trees or using artificial neural networks.

The taxi-in model predicts the number of seconds between the time that the aircraft lands on the runway (ON-the-ground) and the time that the aircraft is ready to park at the stand (IN-to-the-gate). The main contributing factor to taxi time is the distance from the end of the runway the aircraft landed on to the parking stand, following the available taxiways. Other contributing factors include weather (visibility and wet tarmac) and congestion.

When using an artificial neural network, example hyperparameters are as follows:
- Layers: 3 hidden layers each having 500 neurons respectively, and a final output layer with a single node providing the prediction for the taxi-time in seconds;
- Batch Size: 256 samples;
- Iterations per Epoch: 1;
- Number of Epochs 200;
- Updater: RMSPROP
- Learning Rate: 0.01 initial value (this can be changed automatically by the RMSPROP updater);
- Regularization: L2, 0.05;
- Momentum: 0.9;
- Loss/Error Function: Mean Squared Error (MSE); and
- Activation/Transfer Function: Leaky Rectified Linear Units (leaky-RELU) for neurons in the hidden layers, while the activation function is the Identity Function as required for regression models.

The combination of runway and terminal (or ideally gate/stand) are the main factors for determining taxi-time, and thus the features for the taxi-in machine learning prediction model include features identifying the determined runway and terminal for the aircraft in question. NOTAMs may also carry information on the closed status of taxiways at the airport. Closure of taxiways will impact the flow of aircraft on the ground and thus a feature may be added to identify which taxiways are expected to be closed or open at the estimated ON landing time of the aircraft in question.

Congestion plays an important role in predicting the taxi-in time, thus the number of aircraft landing on a runway is predicted for each runway at the airport for each of a plurality of time windows shortly before the predicted arrival of the aircraft in question; these numbers of aircraft can then be used as an identification of the level of congestion at the destination airport. The aggregate number of aircraft landing, during each time window, that are destined for each terminal of the airport may also be recorded as further congestion features. Average departure and arrival traffic volumes at the destination airport for a plurality of time windows around the scheduled time and day of the week of arrival for the flight in question may also be used to provide typical congestion data to the model.

Taxi times may vary by aircraft type, the aircraft itself or by airline, and so statistics on these variables may be pre-calculated and used as further indicative features. These statistics may include the mean, median and standard deviation taxi-in times for each aircraft type, for each physical aircraft/tail number, and for each airline. The number of minutes of flying time specified in the flight plan and the number of minutes of estimated arrival delay based on estimated ON recorded in the flight plan can also be included as features. The identity of the airline operating the aircraft and features describing the aircraft type, as well as the relative size and wake vortex turbulence may again further improve the accuracy of the machine learning model predictions. Similarly, features specifying the current day of the week, the hour of the day, whether it is currently daylight hours and whether the flight is a national, international, or intercontinental flight may also improve the taxi-in time predictions.

Other relevant weather features, which can be obtained by analysing METAR and TAF data, are by how many degrees the wind direction has changed in the last x minutes (for example 30 minutes) the wind speed and gust speed, the cross-wind speed across the most optimal runway, the side gust speed across most optimal runway, the altitude and density of the lowest cloud layer, the visibility of the airport ground in meters, and the intensity of any thunderstorm, fog, rain, snow, hail, volcanic ash, smoke, dust storm, sand storm and funnel cloud intensity. These features may be predicted for the current time window and one or more future time windows.

Each training sample for the taxi-in time prediction model represents a single arriving aircraft. The input features of each training sample contain information important to determine the taxi-time, and the single output label represents the taxi-time itself. The source data contains only the actual ON and IN timestamps, but does not distinguish between a very long taxi-time due to congestion and a short taxi-time followed by the aircraft having to wait for the stand to become available (which may be common for aircraft that have arrived early). For this reason, flights with exceptionally long taxi-times may be filtered out and removed from the training data, with the assumption that these delays represent stand wait time and not taxi-in time. Flights may be assumed to have waited for their stand to become available if the recorded taxi-in time is more than a given threshold (e.g. 60 minutes), or the recorded taxi-in time is more than the average taxi-in time plus one standard deviation for the determined combination of runway and terminal.

The aim of the taxi-in time model is not to predict when the aircraft will finally park at the assigned stand, but when it is ready to park at the assigned stand. This further enables the method and system of the present invention to assist in the allocation of the stands available at the airport, based on the prediction of when these stands will be required.

Confidence Model

In addition to the above models, a machine learning confidence model is preferably included to provide a confidence level to qualify each prediction. This confidence level may be indicated as plus or minus x minutes and will be determined to be the sum of the prediction error and the static error, i.e. the sum of the error in arrival predictions and the static inherent error in the confidence model itself.

The confidence model may be in the form of a neural network or a random forest prediction model. For a random forest prediction model with a set of decision trees each having an equal vote for the prediction, example hyperparameters are as follows:

Maximum Depth: 30;
Maximum number of Bins: 256;
Number of Decision Trees: 75;
Number of Features per Tree: Square root of total number of features; and
Impurity: Variance.

The contributing factors to prediction errors fall into two categories:
  inherent weaknesses of the predictive model (such as the lack of certain relevant data or the use of weakly correlating features); and
  weaknesses in the data specific for certain conditions, such as certain routes, origin airports, and weather patterns, etc.—examples of this could be an origin airport where weather forecasts are commonly of poor quality, routes that span over large areas of water where position data is typically sparse or unreliable, or specific weather conditions that occur infrequently such that the statistical significance in the training data is low.

The confidence model contains a union of all of the features from each of the other models and combines these features into a single feature vector. The initial training set for the confidence model contains one training sample per historical prediction for each historical flight. In order to reduce the complexity of the large number of training samples, the confidence model may use only a random subset of the available training samples. Each sample represents one historical prediction for a flight and its error. The features cover all of the features for the other predictive models, and the target/output of the confidence model represents the overall error in predictions made by the other predictive models.

When the confidence model is trained, the features for the models can be used to create the joined set of features for the confidence model, and this feature vector can be used to predict the overall error in the final ON prediction for each aircraft.

SUMMARY

As set out above, the inventors have appreciated that flight arrival time predictions may be improved by breaking the overall prediction down into a plurality of sub-predictions, in particular predictions governed by the following prediction modules:
  a Departure Delay Model predicting the time between the scheduled departure time and actual take-off, which includes both the departure delay (time between scheduled departure and actual OUT) and taxi-out time (time between actual OUT and actual OFF);

a Time to STAR Model predicting the time from take-off (if the prediction is made before departure) or the current position/time (if the prediction is made after departure) and the time that the aircraft enters its STAR pattern at the destination airport;

a Time in STAR Model predicting the total time the aircraft is within the STAR pattern, from STAR entry to touchdown on the runway; and a Runway Model predicting the runway, or combination of runways, in use for arriving aircraft at the destination airport for each time window over the next day, with arrivals being assigned an assumed runway based on the aircraft's estimated time of arrival and STAR.

A Taxi-in Time Model predicting the time between the aircraft touching down (ON) and the aircraft parking at the stand/gate (IN) may also be optionally included.

A common framework is applied to each of the predictive models, where possible, and a large number of the features used as inputs for the predictive models are common between the models as set out above. While a wide variety of features have been discussed in relation to each of the respective predictive models in the present disclosure, the skilled person will appreciate that accurate predictions can be made by using only a subset of the features discussed for any given predictive model and that it is not essential to use each and every feature listed.

For completeness, it is noted that the flowcharts of FIGS. 2 to 6 illustrate the operation of example implementations of respective methods according to the present disclosure. Each block in the flowcharts may represent a module comprising one or more executable computer instructions, or a portion of an instruction, for implementing the relevant logical function specified in the block. The order of blocks in the Figures is only intended to be illustrative of an example. In alternative implementations, the logical functions illustrated in particular blocks may occur out of the order noted in Figures. For example, the processes associated with two blocks may be carried out simultaneously or, depending on the functionality, in the reverse order. Moreover, each block in the flowchart may be implemented in software, hardware or a combination of software and hardware.

As will be appreciated by the skilled person, the subject matter described herein may be embodied in whole or in part as a method, a system, or a computer program product including computer readable instructions. Accordingly, the subject matter of the present disclosure may take the form of an entirely hardware embodiment, an entirely software embodiment, or an embodiment combining software, firmware, hardware and/or any other suitable approach or apparatus.

Any computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

During the training and data aggregation process, training samples are preferably pre-processed. Although these pre-processing steps will vary from one model to the other, as will be appreciated by the person skilled in the art, the typical pre-processing steps may be considered to include filtering, splitting data between training data and validation data, scaling feature values, performing principle component analysis, and shuffling the training data.

The aim of the filtering steps is to remove any outliers. This enables errors and noise from the training data to be advantageously removed. Typically, a filter may be implemented to remove training samples whose label or target is outside of a configurable range. For example, in the departure delay model it may be desirable to remove training samples having an observed delay of less than −30 minutes (leaving half an hour early) or greater than 600 minutes (delayed by 10 hours or more) as it is likely that these samples relate to incorrect data.

The splitting of the training data between training data and validation data will differ from one prediction model to the next, but the aim of this is to ensure that there is no seepage of data from the training data to the validation data. For example, in the departure delay model the data may preferably be split by day. This means that flights on any given date will be grouped together and either all be in the training data or all be in the validation data.

This is advantageous because the conditions on any given day may be unique and so the data for all of the flights impacted by these conditions should be kept together. This split between the training and validation data is preferably performed prior to any scaling or principle component analysis.

For the predictive models using algorithms that are not based on decision trees, each of the features are preferably scaled to have a zero mean and a unit variance/standard deviation. This may be achieved by changing the value for each individual feature by subtracting the mean value and dividing by the standard deviation (where this is not zero). It should however be noted that features having binary values are preferably not scaled.

In order to eliminate the impact of potential multicollinearity in any of the predictive models, principle component analysis may be applied to the training dataset in order to translate the original features of the predictive model (which may be correlated to some degree) into a new set of features that are linearly uncorrelated. The principle component analysis is configurable using a parameter that specifies the percentage of the overall variance to be preserved. This is effectively setting the overall amount of information to be retained and this is preferably set to be 99%.

The final part of the pre-processing is performing a random shuffle of the training data. The aim of this is to evenly distribute the data across the training set, so as to achieve an even distribution of samples having no/short/medium/long delays across the departure delay training samples. In some cases, it may be necessary to force this distribution, instead of purely relying on a random shuffle of the data.

Once each of the predictive models has been trained, corresponding predictions may be obtained by inputting data into the models in the same format as the training data that the predictive models were trained on.

One implementation of the present invention may perform the following steps each minute:
1. update the registry with any new arrivals;
2. update the existing arrivals with any new data;
   a. map position data to identify a corresponding STAR and runway, if possible; and
   b. calculate the most likely STAR, taking into account the airline and the airport of origin;

3. purge any flights that arrived 2 hours ago or earlier;
4. detect the current runway direction(s) in use at the destination airport;
5. perform runway predictions:
   a. predict the runway direction(s) for each 15-minute time-slot for the next 24 hours using the runway prediction model; and
   b. for each future arrival, assign a runway based on the predicted runway+STAR;
6. predict the departure delay and taxi-out time using the departure delay prediction model: Predicted OFF=Scheduled OUT+predicted delay+Predicted taxi-out time;
7. predict the time to STAR using the time to STAR prediction model: Predicted on-approach=Predicted OFF+predicted time in STAR;
8. predict the time in STAR using the time in STAR prediction model: Predicted ON=Predicted on-approach+predicted time in STAR;
9. predict the taxi-in times using the taxi-in prediction model: Predicted IN=Predicted ON+Predicted taxi-in time;
10. calculate a confidence level for the predictions using the confidence prediction model; and
11. log each of the predictions to a database for reporting.

The invention claimed is:

1. A computer implemented method for predicting a flight arrival time of a given aircraft flight, between an origin airport and a destination airport, of a given aircraft based on a set of features, the method comprising:
   receiving, at an input interface, the set of features and a scheduled departure time of the given aircraft flight from the origin airport;
   receiving, at the input interface, a flight plan route comprising a plurality of waypoints indicating a flight path for the given aircraft flight;
   determining, by a processor, an estimated standard terminal arrival route for the given aircraft from a plurality of standard terminal arrival routes of the destination airport as the standard terminal arrival route with an entry point that is closest in distance to a final waypoint of the flight plan route;
   receiving, at the input interface, an indication of a wake vortex size and an estimated landing order for each of a plurality of aircraft estimated to be flying between the entry point of the estimated standard terminal arrival route and a runway of the destination airport, wherein the estimated landing order represents an order that each aircraft of the plurality of aircraft is estimated to land on the runway of the destination airport;
   determining, by a first predictive unit, a predicted time delay of a flight departure time of the given aircraft flight from the origin airport by applying a first trained machine learning predictive model to a first plurality of features of the set of features,
      wherein the first trained machine learning predictive model is a first regression model comprised of a first artificial neural network,
      wherein the first plurality of features comprises a plurality of samples of airport weather data indicating weather conditions at the origin airport at respective points in time and an actual or estimated arrival delay of the given aircraft at the origin airport from a previous flight of the given aircraft as a percentage of a time duration between a scheduled arrival time of the previous flight of the given aircraft and the scheduled departure time of the given aircraft flight, and
      wherein values for features relating to the airport weather data are weighted based on an intensity of the weather conditions;
   determining, by a second predictive unit, a predicted time duration of the given aircraft flight from the origin airport to the entry point of a standard terminal arrival route by applying a second trained machine learning predictive model to a second plurality of features of the set of features,
      wherein the second trained machine learning predictive model is a second regression model comprised of a second artificial neural network, and
      wherein the second plurality of features comprises the estimated standard terminal arrival route, an estimated flight time between the origin airport and the entry point of the estimated standard terminal arrival route, an actual or predicted take-off time for the given aircraft flight, and a distance from the origin airport to the destination airport;
   determining, by the processor, a minimum spacing between each pair of adjacent aircraft based on the estimated landing order and the indication of the wake vortex size for each of the plurality of aircraft;
   determining, by the processor, an aggregate wake vortex spacing distance for a standard terminal approach route by summing the minimum spacing between each pair of adjacent aircraft;
   determining, by a third predictive unit, a predicted time duration of the given aircraft flight from the entry point of the standard terminal arrival route for the destination airport to landing on the runway of the destination airport by applying a third trained machine learning predictive model to a third plurality of features of the set of features, the third plurality of features comprising the aggregate wake vortex spacing distance for the standard terminal arrival route,
      wherein the third trained machine learning predictive model is a third regression model comprised of a third artificial neural network, and
      wherein the predicted time duration of the given aircraft flight from the entry point of the standard terminal arrival route for the destination airport to landing on the runway of the destination airport is based, at least in part, on a runway configuration of the destination airport during an associated time window;
   determining, by the processor, the predicted flight arrival time of the given aircraft flight at the destination airport by adding the predicted time delay of a flight departure time of the given aircraft flight from the origin airport, the predicted time duration of the given aircraft flight from the origin airport to the entry point of the standard terminal arrival route for the destination airport and the predicted time duration of the given aircraft flight from the entry point of the standard terminal arrival route for the destination airport to landing on the runway of the destination airport and a received scheduled departure time of the given aircraft flight from the origin airport; and
   outputting, by an output interface, the predicted flight arrival time of the given aircraft flight at the destination airport.

2. The computer implemented method of claim 1, wherein the method further comprises determining an estimated standard terminal approach route for the given aircraft from a plurality of standard terminal approach routes of the destination airport based on one or more of:
- identifying the standard terminal approach route that has an initial waypoint that is closest to a waypoint of a received flight plan corresponding to the given aircraft flight;
- identifying the standard terminal approach route that has an initial waypoint that is closest to a projected flight path from a known location and bearing of the given aircraft to the destination airport;
- or a known most commonly used standard terminal approach route for the given aircraft, wherein the third plurality of features further comprises the standard terminal approach route.

3. The computer implemented method claim 1, wherein the third plurality of features further comprises a runway configuration indicating an availability and a landing direction of each runway of a plurality of possible runways at the destination airport at the predicted flight arrival time of the given aircraft.

4. The computer implemented method of claim 3, further comprising determining an estimated runway configuration of the destination airport at a given moment in time by:
- processing a fourth plurality of features of the set of features using a fourth trained machine learning predictive model to estimate a runway configuration of the destination airport during a next time window at a future moment in time; wherein the fourth plurality of features comprises a plurality of known past runway configurations, each identifying the availability and landing direction of each runway of the plurality of possible runways of the destination airport during a plurality of time windows at past points in time, and a tail wind speed component parallel to a longitudinal axis of the runway for each runway of the plurality of possible runways of the destination airport;
- adding the estimated runway configuration of the destination airport during the next time window to the fourth plurality of features; and
- iteratively repeating the processing of the fourth plurality of features using the fourth trained machine learning predictive model to estimate a runway configuration of the destination airport during each subsequent time window.

5. The computer implemented method of claim 4, wherein the fourth plurality of features further comprises a side wind speed component perpendicular to a longitudinal axis of a runway at the origin airport; a length of time since the runway configuration last changed; a visibility distance at the destination airport; and a number of flights expected to be landing at the destination airport during a time window including the scheduled arrival time of the given aircraft, an adjacent time window prior to the scheduled arrival time and an adjacent time window after the scheduled arrival time.

6. The computer implemented method of claim 1, wherein the method further comprises receiving a flight plan for the given aircraft flight and wherein the third plurality of features further comprises an excess flight time for the given aircraft determined to be equal to a current time minus a time associated with a take-off timestamp for the given aircraft flight minus a duration of a flying time identified in the flight plan.

7. The computer implemented method of claim 1, wherein the third plurality of features further comprises one or more of a received indication of an airline operating a given aircraft flight; a received identification of the origin airport; a received scheduled arrival day of week and time of day for the given aircraft flight; a received indication of whether the scheduled arrival time for the given aircraft flight is during daylight hours; a plurality of received average of aircraft arrival volumes for the destination airport at respective times of day and/or week; received weather data for the destination airport; and/or a received indication of whether the given aircraft has been diverted to the destination airport from a different airport.

8. The computer implemented method of claim 1, wherein the third plurality of features further comprises an indication of a runway capacity at a time of arrival of the given aircraft at the destination airport, wherein the indication of the runway capacity is based on one or more received notices of flight restrictions and hazards corresponding to the time of arrival of the given aircraft.

9. The computer implemented method of claim 1, wherein the airport weather data comprises a wind speed, a wind gust speed, an amount of change in wind direction, a side wind speed component perpendicular to a longitudinal axis of a runway at the origin airport and a side wind gust speed component perpendicular to the longitudinal axis of the runway at the origin airport and wherein the amount of change in wind direction is determined by comparing consecutive samples of received wind data.

10. The computer implemented method of claim 1, wherein the first plurality of features further comprises a plurality of route weather data, indicating the weather conditions at a plurality of locations along the flight plan route of the given aircraft flight, weighted based on a distance between the location along the flight plan route and the origin airport.

11. The computer implemented method of claim 1, wherein the first plurality of features further comprise one or more of a visibility distance at the origin airport, weather data for the destination airport at an estimated arrival time of the given aircraft flight at the destination airport, aviation authority notifications, an identification of an airline operating the given aircraft flight, an indication of aircraft type of the given aircraft, an indication of wake vortex size associated with the given aircraft, a time and a day of week that the given aircraft flight is scheduled to depart on, an indication of whether the scheduled departure time of the given aircraft flight is during daylight hours, a scheduled duration of the given aircraft flight, an airport of departure for the previous flight of the given aircraft, a plurality of time windowed averages for a number of flights departing from the origin airport, and/or an indication of whether the given aircraft flight is a domestic, international or intercontinental flight.

12. The computer implemented method of claim 1, further comprising:
- receiving a rated cruise speed of the given aircraft and an expected cruising altitude for the given aircraft flight;
- determining an estimated average air speed of the given aircraft flight by multiplying the rated cruise speed of the given aircraft by a speed of sound at the expected cruising altitude for the given aircraft flight;
- receiving a plurality of tail-wind speed predictions corresponding to a plurality of segments of the flight path between the origin airport and the entry point of the standard terminal arrival route for the destination airport at the expected cruising altitude;
- determining an effective ground speed for each of the plurality of segments along the flight path by summing the estimated average air speed of the given aircraft flight and the respective tail-wind speed prediction for that segment of the flight path;

determining an estimated flight time for each of the plurality of segments along the flight path by multiplying the effective ground speed for each segment by a length of the respective segment; and determining an estimated flight time between the origin airport and the entry point of the standard terminal arrival route for the destination airport by summing the respective estimated flight times for each of the plurality of segments.

13. The computer implemented method of claim 12, wherein the second plurality of features further comprise an identification of the destination airport, an identification of an airline operating the given aircraft flight, an indication of aircraft type of the given aircraft, an indication of wake vortex size associated with the given aircraft, a time and a day of week that the given aircraft flight is scheduled to depart on, an indication of whether the scheduled departure time of the given aircraft flight is during daylight hours, and/or a number of arriving aircraft estimated to be entering the estimated standard terminal arrival route for the destination airport during each of a plurality of time windows.

14. The computer implemented method of claim 12, wherein the second plurality of features further comprise indications of a wake vortex spacing distance associated with a first pair and a second pair of aircraft, wherein the first pair of aircraft is the given aircraft and an adjacent aircraft estimated to reach the entry point of the standard terminal arrival route before the given aircraft and the second pair of aircraft is the given aircraft and an adjacent aircraft estimated to reach the entry point of the standard terminal arrival route entry point after the given aircraft.

15. The computer implemented method of claim 12, wherein the second plurality of features further comprise one or more of a visibility distance at the origin airport, weather data for the destination airport at an estimated arrival time of the given aircraft flight at the destination airport, a plurality of samples of weather data indicating the weather conditions at respective points in time along the path of the flight plan route, aviation authority notifications, a scheduled duration of the given aircraft flight, an airport of departure for the previous flight of the given aircraft, and/or an indication of whether the given aircraft flight is a domestic, international or intercontinental flight.

16. The computer implemented method of claim 12, further comprising:

receiving location information for the origin airport, the destination airport and a most recent location of the given aircraft; and determining an indication of a percentage distance travelled by the given aircraft between the origin airport and the destination airport based on the location of the origin airport, the location of the destination airport and the most recent location of the given aircraft, wherein the second plurality of features further comprise the indication of the percentage distance travelled by the given aircraft between the origin airport and the destination airport.

17. The computer implemented method of claim 1, wherein the predicted flight arrival time of the given aircraft flight at the destination airport is transmitted to an autonomous flight handling system.

18. A system for predicting a flight arrival time of a given aircraft flight, between an origin airport and a destination airport, of a given aircraft based on a set of features, the system comprising:

receiving, by an input interface, the set of features, a scheduled departure time of the given aircraft flight from the origin airport, a flight plan route comprising a plurality of waypoints indicating a flight path for the given aircraft flight, and an indication of a wake vortex size and estimated landing order for each of a plurality of aircraft estimated to be flying between an entry point of an estimated standard terminal arrival route and a runway of the destination airport, wherein the estimated landing order represents an order that each aircraft of the plurality of aircraft is estimated to land on the runway of the destination airport;

determining the estimated standard terminal arrival route for the given aircraft from a plurality of standard terminal arrival routes of the destination airport as the standard terminal arrival route, wherein the entry point associated with the standard terminal arrival route is closest in distance to a final waypoint of the flight plan route;

determining, by a first predictive unit, a predicted time delay of a flight departure time of the given aircraft flight from the origin airport by applying a first trained machine learning predictive model to a first plurality of features of the set of features, wherein the first trained machine learning predictive model is a first regression model comprised of a first artificial neural network, wherein the first plurality of features comprises a plurality of samples of airport weather data indicating weather conditions at the origin airport at respective points in time and an actual or estimated arrival delay of the given aircraft at the origin airport from a previous flight of the given aircraft as a percentage of a time duration between a scheduled arrival time of the previous flight of the given aircraft and the scheduled departure time of the given aircraft flight, and wherein values for features relating to the airport weather data are weighted based on an intensity of the weather conditions;

determining, by a second predictive unit, a predicted time duration of the given aircraft flight from the origin airport to the entry point of the estimated standard terminal arrival route by applying a second trained machine learning predictive model to a second plurality of features of the set of features, wherein the second trained machine learning predictive model is a second regression model comprised of a second artificial neural network, and wherein the second plurality of features comprises the estimated standard terminal arrival route, an estimated flight time between the origin airport and the entry point of the estimated standard terminal arrival route, an actual or predicted take-off time for the given aircraft flight, and a distance from the origin airport to the destination airport;

determining a minimum spacing between each pair of adjacent aircraft based on the estimated landing order and the indication of the wake vortex size for each of the plurality of aircraft;

determining an aggregate wake vortex spacing distance for a standard terminal approach route by summing the minimum spacing between each pair of adjacent aircraft;

determining, by a third predictive unit, a predicted time duration of the given aircraft flight from the entry point of the standard terminal arrival route for the destination airport to landing on the runway of the destination airport by applying a third trained machine learning predictive model to a third plurality of features of the set of features, the third plurality of features comprising the determined aggregate wake vortex spacing distance for the standard terminal arrival route,
wherein the third trained machine learning predictive model is a third regression model comprised of a third artificial neural network, and
wherein the predicted time duration of the given aircraft flight from the entry point of the standard terminal arrival route for the destination airport to landing on the runway of the destination airport is based, at least in part, on a runway configuration of the destination airport during an associated time window;

determining the predicted flight arrival time of the given aircraft flight at the destination airport by adding the predicted time delay of a flight departure time of the given aircraft flight from the origin airport, the predicted time duration of the given aircraft flight from the origin airport to the entry point of the standard terminal arrival route for the destination airport and the predicted time duration of the given aircraft flight from the entry point of the standard terminal arrival route for the destination airport to landing on the runway of the destination airport and a received scheduled departure time of the given aircraft flight from the origin airport; and outputting, by an output interface, the predicted flight arrival time of the given aircraft flight at the destination airport.

19. The system of claim 18, wherein the predicted flight arrival time of the given aircraft flight at the destination airport is transmitted to an autonomous flight handling system.

\* \* \* \* \*